United States Patent
Modestino et al.

(10) Patent No.: US 11,203,812 B2
(45) Date of Patent: Dec. 21, 2021

(54) METHODS AND ELECTROCHEMICAL CELLS FOR REDOX MEDIATED HYDROGEN PRODUCTION

(71) Applicant: New York University, New York, NY (US)

(72) Inventors: Miguel A. Modestino, New York, NY (US); Yury Dvorkin, New York, NY (US); Daniel Frey, New York, NY (US); Daniela Eugenia Blanco Jimenez, Brooklyn, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 16/799,454

(22) Filed: Feb. 24, 2020

(65) Prior Publication Data
US 2020/0270755 A1 Aug. 27, 2020

Related U.S. Application Data

(60) Provisional application No. 62/809,429, filed on Feb. 22, 2019.

(51) Int. Cl.
| | |
|---|---|
| *C25B 1/04* | (2021.01) |
| *C25B 9/73* | (2021.01) |
| *C25B 9/19* | (2021.01) |
| *C25B 1/02* | (2006.01) |
| *C25B 15/08* | (2006.01) |
| *H01M 16/00* | (2006.01) |

(52) U.S. Cl.
CPC .............. *C25B 1/04* (2013.01); *C25B 1/02* (2013.01); *C25B 9/19* (2021.01); *C25B 9/73* (2021.01); *C25B 15/08* (2013.01); *H01M 16/003* (2013.01)

(58) Field of Classification Search
CPC .. C25B 1/04; C25B 1/10; C25B 15/08; C25B 15/087
See application file for complete search history.

(56) References Cited

U.S. PATENT DOCUMENTS

| | | | | |
|---|---|---|---|---|
| 2013/0001094 | A1* | 1/2013 | Cable | H01M 14/00 205/340 |
| 2013/0256152 | A1* | 10/2013 | Creeth | C25B 9/19 205/637 |
| 2014/0318979 | A1* | 10/2014 | Cronin | C25B 5/00 205/340 |
| 2015/0017494 | A1* | 1/2015 | Amstutz | H01M 4/8615 429/70 |
| 2018/0269516 | A1* | 9/2018 | Wang | H01M 8/04925 |

* cited by examiner

*Primary Examiner* — Brian W Cohen
(74) *Attorney, Agent, or Firm* — Hodgson Russ LLP

(57) ABSTRACT

Provided are electrochemical cells for hydrogen production and methods for hydrogen production. The electrochemical cell and methods use a mediator that may have a reversible redox potential lying outside the onset of the oxygen evolution reaction (OER) and the hydrogen evolution reaction (HER). Also, provided are systems for generating hydrogen and water from oxygen and generating water from oxygen and hydrogen.

8 Claims, 25 Drawing Sheets
(22 of 25 Drawing Sheet(s) Filed in Color)

METHODS AND ELECTROCHEMICAL CELLS FOR REDOX MEDIATED HYDROGEN PRODUCTION

CROSS REFERENCE TO RELATED APPLICATIONS

This application claims priority to U.S. Provisional Application No. 62/809,429, filed on Feb. 22, 2019, the disclosure of which is hereby incorporated by reference.

STATEMENT REGARDING FEDERALLY SPONSORED RESEARCH

This invention was made with government support under contract no. 1760540 awarded by the National Science Foundation. The government has certain rights in the invention.

BACKGROUND OF THE DISCLOSURE

The implementation of electrolysis systems for electrochemical hydrogen production has continued to grow as the paradigm shift towards renewable energy and fuels progresses. However, issues regarding conventional polymer electrolyte membrane (PEM) electrolysis systems remain; the performance of PEM electrolyzers degrade if operated with intermittent energy sources, while the high cost of electricity continues to hinder large scale adoption of the technology. In order to make electrochemical hydrogen production more feasible and compete with methane reforming on a large scale, renewable energy sources need to be used along with new strategies electrochemical hydrogen production. Decoupled electrolysis systems have been studied to temporally and spatially separate the evolution of hydrogen and oxygen, making the electrolysis system safer, but these systems tend to reduce efficiency and increase electricity costs.

Water electrolyzers, i.e. devices used for hydrogen ($H_2$) production, can be operated in a schedulable fashion and thus provide flexibility to power grids (e.g., additional energy, power, and ancillary services) on sec-to-sec to seasonal timescales. To facilitate the cost-efficiency of these systems, electrolysis can be scheduled for periods with low electricity costs. Unlike other schedulable industry-scale processes (e.g., steel manufacturing), hydrogen itself can be used to store electricity and perform spatio-temporal energy arbitrage and provide ancillary services just like other energy storage (ES) technologies (e.g., batteries or pumped hydro).

The low levelized cost of storage (LCOS) for long-duration energy storage (LDES) applications strongly depends on the cost of the energy storage media and the efficiency of the system. While multiple electrochemical energy conversion devices exist, they exhibit trade-off between costs and performance that do not satisfy LDES requirements. Systems such as Li-ion batteries or Vanadium redox flow-batteries are optimized to tackle shorter timeframes of energy storage where the cost of the energy storage media is not as significant and there are more stringent requirements with respect to round-trip efficiency and cost of power components. On the other hand, systems such as regenerative fuel cells rely on a fairly inexpensive storage media (i.e. $H_2$) but suffer from low round-trip efficiency.

Increased efforts to curb global warming have led to a drastic surge in the deployment of renewable electricity sources, such as wind and solar power. However, as these sources form a larger fraction of the energy on the grid, their intermittency causes supply instability which can lead to large fluctuations in energy prices.

The implementation of electrolysis systems for electrochemical hydrogen production has continued to grow as the paradigm shift towards renewable energy and fuels progresses. However, issues regarding conventional polymer electrolyte membrane (PEM) electrolysis systems remain; the performance of PEM electrolyzers degrade if operated with intermittent energy sources, while the high cost of electricity continues to hinder large-scale adoption of the technology.

SUMMARY OF THE DISCLOSURE

The present disclosure provides methods for producing hydrogen and/or oxygen. The present disclosure also provides electrochemical cells and energy storage systems.

In an aspect, the present disclosure provides methods for producing hydrogen and/or oxygen. The methods may be based on use of a mediator (e.g., a redox intermediate) having a reversible redox potential lying outside the onset of the oxygen evolution reaction (OER) and the hydrogen evolution reaction (HER). Various mediators can be used. A mediator can be oxidized to provide an oxidized mediator. An oxidized mediator can be reduced to provide a reduced mediator. A mediator that has (at least) two different oxidation states, which oxidation states may be accessed by oxidation or reduction from one state to the other. A mediator can comprise various anions. It is desirable that the anion be soluble in aqueous and non-aqueous electrolytes.

The present disclosure provides the advantage that the hydrogen and oxygen generation steps may be separated in time and/or space. Thus, for example, hydrogen is generated with concomitant oxidation of a mediator (e.g., redox intermediate). Later, the same oxidized mediator (e.g., redox intermediate) is used in a method to generate oxygen. Either the oxygen generation step or the hydrogen generation step may be performed first, if the reactions are to be run separately.

The present disclosure provides methods for the generation of hydrogen from protons using a mediator, which is oxidized in the process. The methods comprise reducing protons to generate hydrogen and oxidizing a mediator (which may be a reduced mediator) to generate an oxidized mediator. In various examples, a method for the generation of hydrogen comprises oxidizing a mediator at a working electrode to yield an oxidized mediator and reducing protons at a counter electrode to yield hydrogen. The hydrogen generated may be collected, and, optionally, pressurized, for storage and/or future use.

The present disclosure provides methods for the electrochemical generation of oxygen. The methods comprise oxidizing water to generate oxygen and reducing a mediator (which may be an oxidized mediator) to generate a reduced mediator. The yield of oxygen, with reference to the amount of electrons passed through the system, is desirable. The methods may comprise providing and maintaining a potential across the working electrode and the counter electrode and/or the reference electrode, where present. After the reaction is complete, the reduced mediator may be recovered. The reduced mediator may be oxidized to obtain (oxidized) mediator, which can be used in further oxygen production methods. The reduced mediator may be oxidized using electrochemical techniques. In an example, the mediator is oxidized in a hydrogen production method. Thus, the recycling of the mediator may be linked to the production of a useful product such as, for example, hydrogen. The oxygen generated may be collected, and optionally pressurized, for storage and/or future use.

The present disclosure provides independent methods for the generation of hydrogen and the generation of oxygen. Each of these methods may be used together to produce both hydrogen and oxygen. In various examples, the methods of generating hydrogen and methods of generating oxygen are used to provide a method for the generation of hydrogen and oxygen.

In an aspect, the present disclosure provides electrochemical cells. The electrochemical cells can be used to produce hydrogen and/or oxygen. In various examples, a method for producing hydrogen and/or oxygen of the present disclosure is carried out using one or more of the electrochemical cell(s). The electrochemical cells can comprise aqueous and non-aqueous electrolytes. For example, the electrolyte is an ionic liquid.

An electrochemical cell and/or system where the mediator is separated from the counter electrode side of the cell is desirable in that the mediator cannot interfere with the chemistries that are occurring at the counter electrode. The membrane (e.g., semipermeable membrane) prevents movement of the mediator, for example, from the working electrode side of the electrochemical cell (e.g., the working electrode electrolyte space) to the counter electrode side of the electrochemical cell (e.g., the counter electrode electrolyte space). The membrane permits movement of other ions, such as, for example, protons, from, for example, moving from the working electrode electrolyte space to the counter electrode electrolyte space, and vice versa. For example, the membrane is a cationic permeable membrane (e.g., a proton permeable membrane).

In an aspect, the present disclosure provides energy storage systems. The energy storage systems can be used to store energy in the form of hydrogen. In various examples, a charging subsystem based on a redox-mediated water-splitting device comprising one or more electrochemical cell(s) of the present disclosure stores energy in the form of hydrogen ($H_2$) and a discharging subsystem based on, for example, a polymer-electrolyte fuel cell (PEFC) that uses $H_2$ to generate electricity. In various examples, the present disclosure provides energy storage systems to enable the flexible use of water electrolyzers for power grid operations. The systems use electrochemical energy conversion technology based on a redox mediated hydrogen generation and energy storage (ES) device.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a fuller understanding of the nature and objects of the disclosure, reference should be made to the following detailed description taken in conjunction with the accompanying figures.

DETAILED DESCRIPTION OF THE DISCLOSURE

Figure 1:
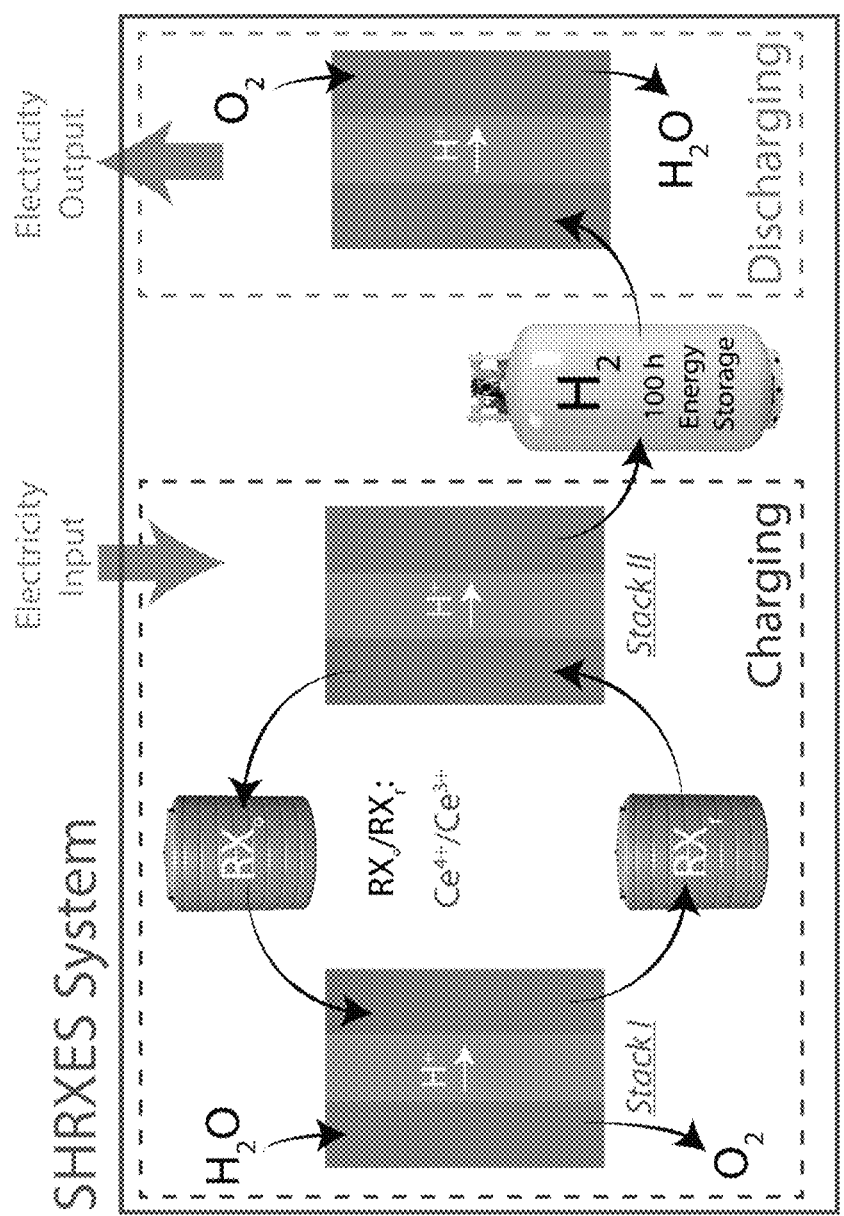
FIG. 1 shows a synergistic hydrogen redox energy storage (SHRXES) system design. The charging systems stores electricity in the form $H_2$, and involves a redox cycle, where redox species are reduced to $RX_r$ in stack I and oxidized to $RX_o$ in stack II. The discharging subsystem uses $H_2$ to generate electricity in a PEM fuel cell.

Although claimed subject matter will be described in terms of certain examples, other examples, including examples that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

As used herein, unless otherwise stated, "sec" refers to second(s), "min" refers to minute(s), and "h" refers to hour(s).

The articles "a" and "an" are used in this disclosure to refer to one or more than one (i.e., to at least one) of the grammatical object of the article. By way of example, "an element" means one element or more than one element.

The present disclosure provides methods for producing hydrogen and/or oxygen. The present disclosure also provides electrochemical cells and energy storage systems.

In an aspect, the present disclosure provides methods for producing hydrogen and/or oxygen. The methods may be based on use of a mediator (e.g., redox intermediate) having a reversible redox potential lying outside the onset of the oxygen evolution reaction (OER) and the hydrogen evolution reaction (HER). Non-limiting examples of methods for producing hydrogen and oxygen are provided herein.

The present disclosure provides an advantage that the hydrogen and oxygen generation steps may be separated in time and/or space. Thus, for example, hydrogen is generated with concomitant oxidation of a mediator (e.g., redox intermediate). Later, the same oxidized mediator (e.g., redox intermediate) is used in a method to generate oxygen. Either the oxygen generation step or the hydrogen generation step may be performed first, if the reactions are to be run separately.

Various mediators can be used. A mediator can be oxidized to provide an oxidized mediator. An oxidized mediator can be reduced to provide a reduced mediator. A mediator has two or more (at least two) different oxidation states, which oxidation states may be accessed by oxidation or reduction from one state to the other. It is desirable that a mediator is thermally and oxidatively stable in both the oxidized form and the reduced form. It is also desirable that a mediator has minimal cross reactivity with other components within an electrochemical cell (e.g., the electrodes, other components of the electrolyte, and the like). The mediators comprise one or more metal ion(s). Non-limiting examples of suitable metal ions include Ce(III), Nd(III), Pr(IV), Pr(III), Pr(II), Co(III), Co(II), and the like, and combinations thereof.

A mediator can comprise various anions. It is desirable that the anion be soluble in aqueous and/or non-aqueous electrolytes. For example, it is desirable that the anion be soluble in an ionic liquid. As an illustrative example, a mediator comprises (e.g., is) a Ce(III) metal ion and a methane sulfonate anion.

The mediator(s) may be used at various concentrations. For example, mediator(s) are present at a concentration of 0.5 to 2.0 M, including all 0.1 M values and ranges there between. In another example, mediator(s) are present at a concentration (independently or collectively) of 0.1 M to 20 M (e.g., 0.1 M to 10 M), including all 0.1 values and ranges therebetween.

The present disclosure provides methods for the generation of hydrogen from protons using a mediator, which is oxidized in the process. The methods comprise reducing protons to generate hydrogen and oxidizing a mediator (which may be a reduced mediator) to generate an oxidized mediator. In various examples, a method for the generation of hydrogen comprises oxidizing a mediator at a working electrode to yield an oxidized mediator and reducing protons at a counter electrode to yield hydrogen. The yield of hydrogen, with reference to the amount of electrons passed through the system, may be desirable. The Faradaic efficiency of hydrogen may be at least 90%, at least 95%, or 100%. In an example, the mediator (in either reduced or oxidized form) is prevented from contacting the counter electrode. A semi-permeable membrane, such as, for example, described herein, may be provided for this purpose.

The methods may comprise providing and maintaining a potential across the working electrode and the counter electrode and/or the reference electrode, where present. In various examples, the potential applied between the working and counter electrodes is at most 2.0 V, is at most 1.5 V, is at most 1.3 V, is at most 1.2 V, or is at most 1.1 V. For the avoidance of doubt, in the hydrogen generation step, the working electrode is an anode and the counter electrode is the cathode.

In various examples, the electrolyte used in the electrochemical reaction (which may be an aqueous electrolyte) has a pH that is at most 6, at most 5, at most 4, at most 3, or at most 2. In various other examples, the electrolyte has a pH that is at least 0.1, at least 0.2, or at least 0.3. In various examples, the electrolyte has a pH that is in a range having upper and lower values selected from the values above.

The pH of the electrolyte solution may be maintained at a substantially constant level during the electrochemical reaction. Thus, in an example, the electrolyte is buffered. The mediator itself may fulfill this function, for example where the mediator is capable of donating and accepting protons. In various examples, the change in pH of the electrolyte during the hydrogen generation may be less than 1 unit, less than 0.5 units, less than 0.3 units, less than 0.2 units, or less than 0.1 units of pH.

After the reaction is complete, the oxidized mediator may be recovered. The oxidized mediator may be reduced to obtain (reduced) mediator, which can be used in further hydrogen production methods. The oxidized mediator may be reduced using electrochemical techniques. In an example, the mediator is reduced in an oxygen production method. Thus, the recycling of the mediator may be linked to the production of a useful product such as, for example, oxygen.

The hydrogen generated may be collected, and, optionally, pressurized, for storage and/or future use. Suitable containers (e.g., suitable containers for hydrogen collection and/or pressurization) are well known in the art. Hydrogen presence (e.g., content or concentration) and yields may be determined using standard analytical techniques.

The present disclosure provides methods for the electrochemical generation of oxygen. The methods comprise oxidizing water to generate oxygen and reducing a mediator (which may be an oxidized mediator) to generate a reduced mediator. The yield of oxygen, with reference to the amount of electrons passed through the system, is desirable. The Faradaic efficiency of oxygen may be at least 90%, at least 95% or substantially 100%. In an example, the mediator (in either reduced or oxidized form) is prevented from contacting the counter electrode. A semi-permeable membrane, such as, for example, described herein, may be provided for this purpose.

The methods may comprise providing and maintaining a potential across the working electrode and the counter electrode and/or the reference electrode, where present. For example, the potential applied between the working and counter electrodes is at most $-2.0$ V, is at most $-1.5$ V, is at most $-1.3$ V, is at most $-1.2$ V, or is at most $-1.1$ V. For the avoidance of doubt, in the oxygen generation step, the working electrode is the cathode and the counter electrode is the anode. Thus, by convention, the voltages are expressed in negative terms.

In various examples, the electrolyte used in the electrochemical reaction has a pH that is at most 6, at most 5, at most 4, at most 3, or at most 2. In various examples, the electrolyte has a pH that is at least 0.1, at least 0.2, or at least 0.3. In various examples, the electrolyte has a pH that is in a range having upper and lower values selected from the values above.

The pH of the electrolyte solution may be maintained at a substantially constant level during the electrochemical reaction. Thus, in an example, the electrolyte is buffered. The mediator itself may fulfil this function, for example where the mediator is capable of donating and accepting protons. In a various examples, the change in pH of the electrolyte during the hydrogen generation may be less than 1 unit, less than 0.5 units, less than 0.3 units, less than 0.2 units or less than 0.1 units of pH.

After the reaction is complete, the reduced mediator may be recovered. The reduced mediator may be oxidized to obtain (oxidized) mediator, which can be used in further oxygen production methods. The reduced mediator may be oxidized using electrochemical techniques. In an example, the mediator is oxidized in a hydrogen production method. Thus, the recycling of the mediator may be linked to the production of a useful product such as, for example, hydrogen.

The oxygen generated may be collected, and optionally pressurized, for storage and/or future use. Suitable containers (e.g., suitable containers for oxygen collection and/or pressurization) are well known in the art. Oxygen presence (e.g., content or concentration) and yields may be determined using standard analytical techniques, including, for example, gas chromatography, or the like.

The present disclosure provides independent methods for the generation of hydrogen and the generation of oxygen. Each of these methods may be used together to produce both hydrogen and oxygen. In various examples, the methods of generating hydrogen and methods of generating oxygen are used to provide a method for the generation of hydrogen and oxygen. The hydrogen production step may not be performed simultaneously as the oxygen production step. Thus, the hydrogen and oxygen steps may be referred to as decoupled. Thus, two smaller energy inputs are used to split water to give hydrogen and oxygen at different times, as opposed to a single energy input that produces hydrogen and oxygen simultaneously.

In various exemplary methods, a method of hydrogen generation according to the present disclosure is used in combination with a known oxygen generation method. In other exemplary methods, a method of oxygen generation of the disclosure is used in combination with a known hydrogen generation method. In these exemplary methods, the mediator is not necessarily recycled during the oxygen and/or hydrogen production process. Instead, the mediator may need to be recycled separately, if it is to be reused in a hydrogen or oxygen production step.

An advantage of running the hydrogen and oxygen generation steps independently (in time and/or space) is that the product gases may be collected independently, without any requirement for a separation step. For the avoidance of doubt, it is noted that the oxygen producing may be performed before or after the hydrogen evolving step. The initial step may be selected based on the availability of the mediator in a particular oxidation step, which may favor a reduction or oxidation reaction first.

The oxygen generation may be performed simultaneously with the hydrogen generation and, optionally, at a different current density. The oxygen generation may be performed non-simultaneously relative to the hydrogen generation and, optionally, at a different current density.

In an example, the hydrogen and oxygen producing are performed non-simultaneously (i.e. separately in time). Such a method follows inevitably from the use of the mediator as an electron and, optionally, proton donor. Only once the mediator is converted to its oxidized form it may be used as an electron and proton acceptor. Likewise, only once the mediator is converted to its reduced form may it be used as an electron and, optionally, proton donor. The mediator which is oxidized or reduced in one generation step may be used in the other generation step, where it is reduced or oxidized accordingly, to yield the original mediator species. Thus, the mediator is recycled rather than consumed in the overall process.

The hydrogen and oxygen generation may be performed using the same electrochemical cell. Thus, once an oxygen generating step is complete and the mediator is suitably reduced, the bias across the working and counter electrodes may be reversed, thereby producing hydrogen with concomitant oxidation of the mediator (which is now converted to its original form prior to the oxygen generating step).

After this sequence is complete, the oxygen and the hydrogen evolving steps may be repeated. Recycling of components in this way is particularly suitable for the production of significant amounts of hydrogen and oxygen, and without complex adaptations to the electrochemical cell or system.

The oxygen and hydrogen generated may be collected, and, optionally, pressurized, for storage and/or future use. Suitable containers (e.g., suitable containers for hydrogen and/or oxygen collection and/or pressurization) are well known in the art.

In the methods for the generation of hydrogen and/or oxygen, the reactions may be based on the presence of an aqueous composition, which may be referred to as an electrolyte or a composition. This composition comprises one or more mediator(s). The methods may be conducted at ambient temperature (e.g., 18-25° C., including all 0.1° C. values and ranges therebetween) and/or at ambient pressure (about 1 atm).

It will be apparent to one of skill in the art that the methods of the disclosure may be conducted at higher temperatures or lower temperatures. Changes in temperature may be associated in higher electrochemical efficiencies and reaction yields. In an example, the methods are conducted at a temperature in the range 5-60° C., including all 0.1° C. values and ranges therebetween. In an example, the methods are conducted at a temperature in the range 10-40° C. In an example, the methods are conducted at a temperature in the range 10-35° C. Likewise changes in pressure may also be associated in higher yields, and may be useful to promote the evolution of hydrogen and/or oxygen from the composition. The use of higher pressures (e.g., pressures greater than ambient pressure (such as, for example, an ambient pressure of 1 atmosphere, which may depend on the altitude at which the method is carried out) that may be an exogenously created pressure) may also be advantageous as the gas produced would later need to be pressurized for storage purposes. Higher pressures are also associated with the formation of smaller gas bubbles, for example, smaller bubbles of oxygen, within the composition (electrolyte or mixture), which is associated with greater reaction efficiencies.

Prior to the initiation of a hydrogen and/or oxygen generating method, the composition (the mixture or the electrolyte) and/or container may be purged or evacuated in order to minimize or remove air within the system. The air may be replaced with an inert atmosphere such as, for example, argon, helium, nitrogen, or a combination thereof.

In an aspect, the present disclosure provides electrochemical cells. The electrochemical cells can be used to produce hydrogen and/or oxygen. In various examples, a method for producing hydrogen and/or oxygen of the present disclosure is carried out using one or more of the electrochemical cell(s). Non-limiting examples of electrochemical cells are provided herein.

The electrochemical cells can comprise one or more mediator(s) described herein. The mediator(s) may be used at various concentrations within an electrochemical cell. For example, mediator(s) are present at a concentration of 0.5 to 2.0 M, including all 0.1 M values and ranges therebetween.

The electrochemical cells can comprise aqueous, non-aqueous electrolytes, or a combination thereof. For example, the electrolyte comprises or is an ionic liquid.

Electrodes for use in generation of hydrogen and/or oxygen are well described in the art. Non-limiting examples of electrodes (e.g., working electrodes, counter electrodes, references electrodes, and the like) include those formed from, comprising, or consisting of platinum, platinum oxide, palladium, iridium, iridium oxide, indium-tin oxide and/or carbon, tungsten trioxide, and the like, and combinations thereof (which may be alloys, composites, or the like). Other electrodes are also suitable for use, although it is desirable that such electrodes should be resistant to strong acid. The choice of electrode may be dependent on the nature of the hydrogen or oxygen generation method. The various electrodes may be the same or different (e.g., in terms of composition). The electrodes can have various shapes.

In an example, working and counter electrodes define an electrochemical space in which an electrolyte is provided. The electrochemical space is divided by a semi-permeable membrane to provide a working electrode electrolyte space and a counter electrode electrolyte space. The mediator is provided in the working electrode electrolyte space. No mediator is provided in the counter electrode space. The semi-permeable membrane prevents movement of the mediator (in either the oxidized or reduced form) from moving from the working electrode electrolyte space to the counter electrode electrolyte space, thus the mediator is prevented from contacting the counter electrode surface. An electrochemical cell and/or system where the mediator is separated from the counter electrode side of the cell is desirable in that the mediator cannot interfere with the chemistries that are occurring at the counter electrode. The working and counter electrodes are electrically connected or connectable.

The membrane (e.g., semipermeable membrane) prevents movement of the mediator, for example, from the working electrode side of the electrochemical cell (e.g., the working electrode electrolyte space) to the counter electrode side of the electrochemical cell (e.g., the counter electrode electrolyte space). The membrane permits movement of other ions, such as, for example, protons, from, for example, moving from the working electrode electrolyte space to the counter electrode electrolyte space, and vice versa. For example, the membrane is a cationic permeable membrane (e.g., a proton permeable membrane).

The membrane is not particularly limited. It is desirable that the membrane is capable of preventing movement of the mediator therethrough, while permitting movement of cations, particularly protons, therethrough.

Non-limiting examples of membranes include membranes comprising or consisting of one or more sulfonated tetrafluoroethylene based fluoropolymer-copolymer(s). Nafion® membranes are non-limiting examples of commercially available membranes of this type. Other non-limiting examples of membranes include poly(styrene) sulfonic acid membranes.

In an example, the electrochemical cell further comprises a voltage supply (or power supply). The voltage supply is preferably adapted to supply a constant bias between the working electrode and the counter electrode or the reference electrode, where present. The voltage supply is adapted to supply a constant bias of, for example, up to 2.0 V. In an example, the voltage supply is adapted to supply a constant bias of about 1.0 V. The voltage supply may be reversible as required. The electrochemical cell may further comprise a detector for monitoring current. The electrochemical cell may further comprise a controller for controlling the voltage supply and timing of that supply.

Figure 4:
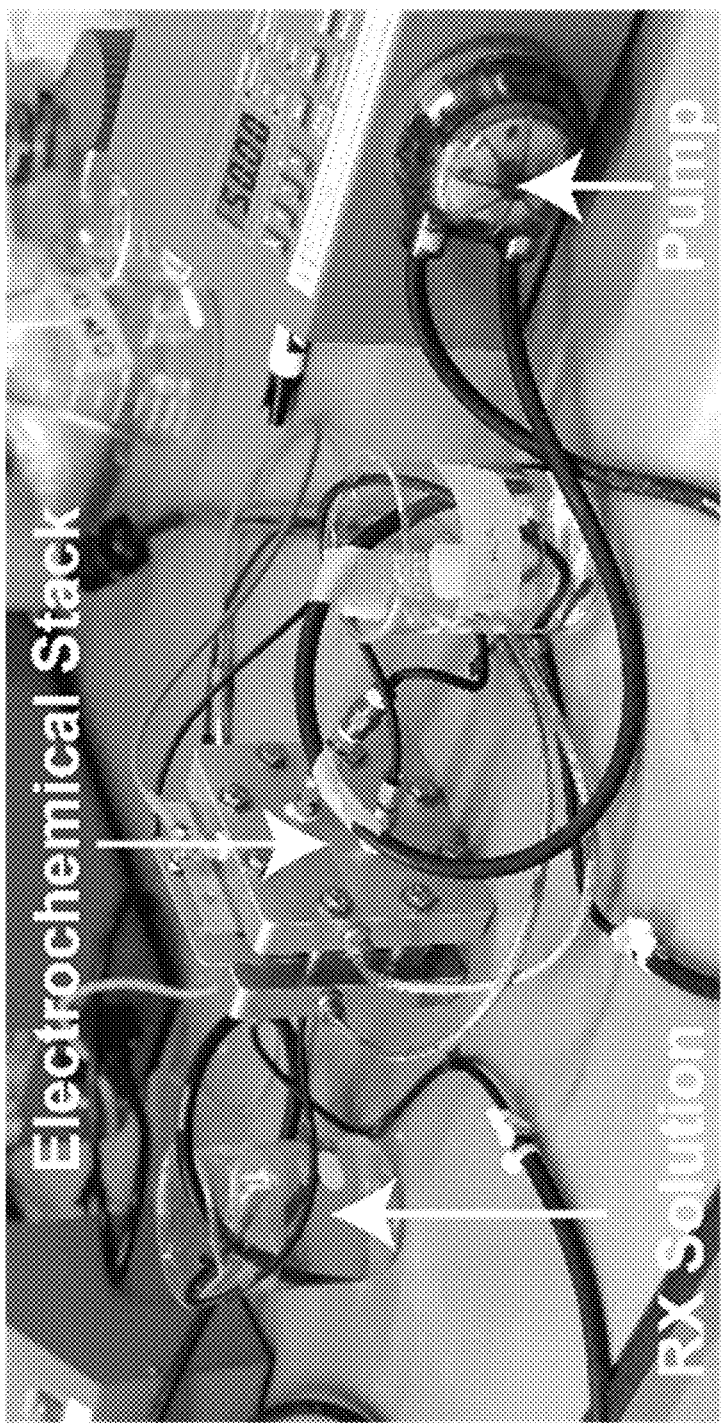
FIG. 4 shows an example of a system of the present disclosure.

In an aspect, the present disclosure provides energy storage systems. The energy storage systems can be used to store energy in the form of hydrogen. In various examples, a charging subsystem is based on a redox-mediated water-splitting device comprising one or more electrochemical cell(s) of the present disclosure or the like and stores energy in the form of hydrogen (H$_2$) and a discharging subsystem based on, for example, a polymer-electrolyte fuel cell (PEFC) that uses H$_2$ to generate electricity or the like. Non-limiting examples of energy storage systems are provided herein (for example in FIG. 4).

Relative to non-electrochemical energy storage units, an advantage of the present technology is that it does not have exogenous (climatic, geographical, policy, etc.) restrictions on its placement, unlike pumped storage hydropower (PSH) units. Furthermore, the instant technology has an advantage of relatively low operating cost due to a relatively high round-trip efficiency and the flexibility to widely adjust the output electrical power (note that PSH units are often restricted to maintain a fixed power output due to hydrological constraints on the penstock).

In various examples, the present disclosure provides energy storage systems to enable the flexible use of water electrolyzers for power grid operations. The systems use electrochemical energy conversion technology based on a redox mediated hydrogen generation and energy storage (ES) device. This technology includes two components. The first one is an ES component in the form of cyclable, energy-dense redox species (e.g., redox mediators as described herein such as, for example, Cerium(III)/Cerium (IV) ions, and the like) and the second one is water electrolysis.

The systems of the present disclosure may advert two significant challenges for the application of this technology in grid operations: (1) the round-trip efficiency of the ES component must be significantly improved and (2) the gas crossover of H$_2$ and O$_2$ must be suppressed to avoid the generation of an explosive gas mixture.

Figure 22:
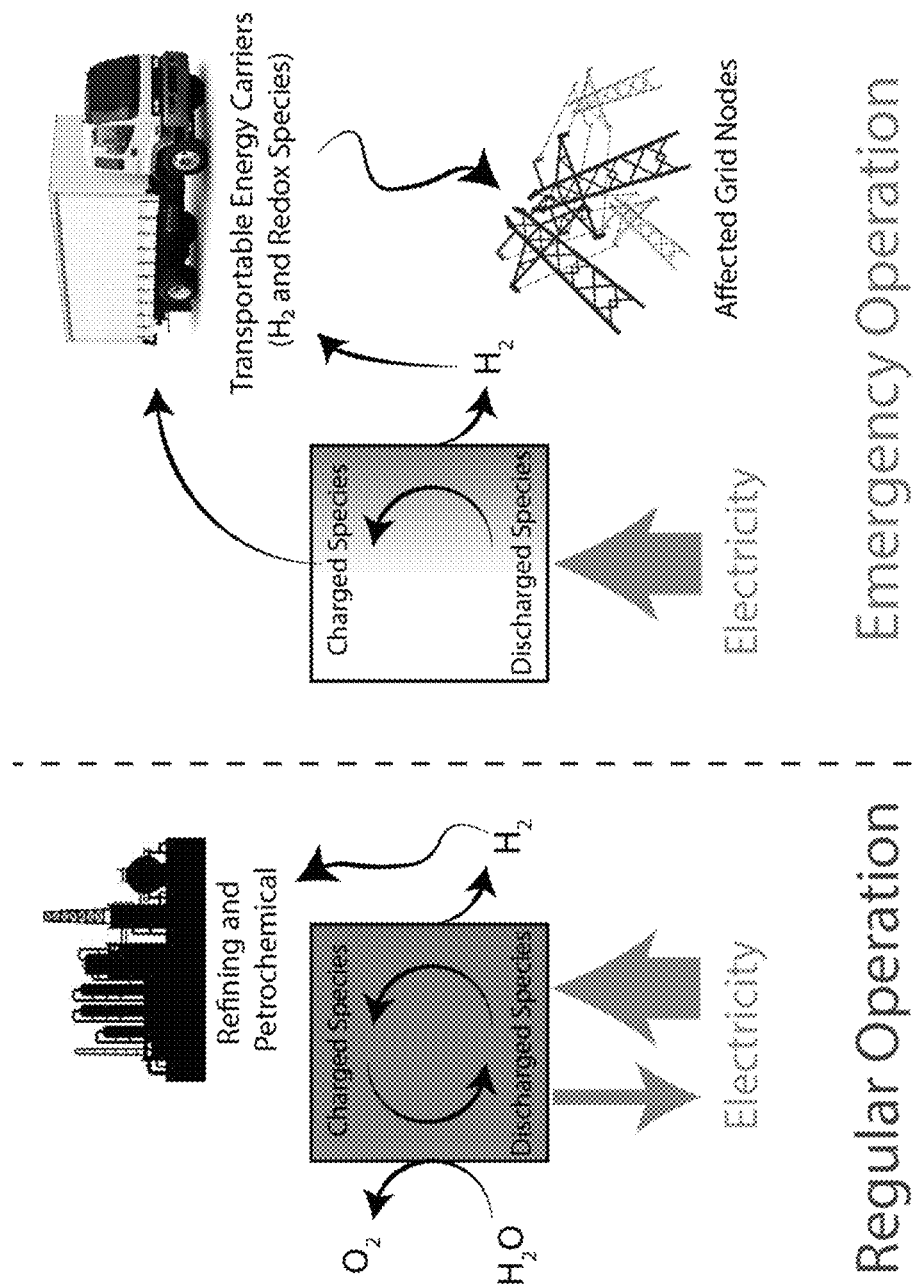
FIG. 22 shows a diagram of an example of a system design during stationary and transportable operations.

Application of an example of this technology is illustrated in FIG. 22 for two possible operational modes. First, this technology can be operated as a stationary resource at a H$_2$-fuel generation facility. In this case, the technology provides grid support services at a single location and can discharge energy stored in the cyclable redox species into the power grid or charge energy from the power grid to regenerate these species. During the stationary operation, the benefits of the technology for the power grid operations are similar to those of other ES technologies. On the other hand, the technology does not cause capacity degradation that is typical for many battery ES technologies. Additionally, the technology will generate added value by simultaneously serving as a grid-scale ES unit and a H$_2$-fuel production device. Second, this technology can be operated as a transportable resource and provide power grid support services at multiple locations as the power grid needs change on an hour-to-hour, day-to-day, and weeks-to-seasons basis. Since the technology uses H$_2$ energy carriers that can be transported via public transportation routes, it can be deployed at variable power grid locations, where other ES technologies are either technologically infeasible or their stationary installation is not economically justified. Another important distinction of the technology relative to alternatives is that its power and energy ratings depend on the amount of energy carriers stored and the speed of the chemical reaction. Therefore, the ES ratings can be changed based on the evolving needs of power grid operators. Furthermore, the transportability of the instant technology can be used for power grid maintenance and mitigation of contingencies. As a transportable resource, the instant technology will compete with portable diesel generators, which are costly to operate and cause noise/air pollution, and customer-owned electric vehicles providing vehicle-to-grid services, which are not directly controlled by power grid operators.

The technology can overcome one or both significant technological limitations of existing electrolyzers that prevent their use in power grid operations: (1) gas crossover will be suppressed by the physical decoupling of the O$_2$ and H$_2$ generation processes in two distinct cells, thus avoiding the production of explosive gas mixtures during idling periods, and (2) the round-trip energy efficiency of the ES component will be enhanced by the introduction of a redox mediator cycle. This cycle will be used to store energy in the form of energy-dense ions with a round-trip efficiency of, for example, greater than 80%. This technology can provide the required flexibility for power grids, to enable the transportation of energy carriers (H$_2$) to multiple power grid locations and, ultimately, to produce H$_2$-fuel at a significantly lower cost. Unlike existing water electrolyzers and flow batteries, the technology of the present disclosure can serve as both ES and H$_2$ production units, leading to economic gains from the synergy of two functions. Advantages over regular electrolyzers may be one or more or all of the following. First, the gas crossover is reduced by physically separating the H$_2$ and O$_2$ evolution chambers. Second, the H$_2$ and O$_2$ evolution reactions (HER and OER, respectively) can take place at different current densities. This will increase efficiencies since the least efficient reaction (OER) can be carried at lower rates than the HER. Third, given the small HER energy losses (i.e. low overpotentials), this reaction may be operated at a variable rate to accommodate fast power grid fluctuations and to capture economic gains from producing at periods with low electricity costs. Relative to flow batteries, the present technology creates an added value, as it also produces H$_2$. Table 1 compares the present technology to a potential combination of a flow battery and an electrolyzer. The present technology is expected to benefit the US electric power and transportation sectors, which are at the core of the US economy. The technology will increase the utilization of renewable resources and reduce hazardous emissions (e.g., CO$_2$, NO$_x$, SO$_x$, and the like, and combinations thereof). Coupling H$_2$ production with grid operations will increase the economic viability of domestic alternative transportation fuels.

TABLE 1

Comparative performance of the instant technology.

| Parameter | Li-ion Battery | Electrolyzer | Instant technology |
| --- | --- | --- | --- |
| Round-trip ES efficiency, % | 80-90% | N/A | >80% |
| H$_2$ production efficiency, % | N/A | 60-70% | >75% |
| Degradation | High | Low | Low |
| Capital Cost | The instant technology is expected to cost less than a coupled battery + electrolyzer | | |

The steps of the method described in the various examples disclosed herein are sufficient to carry out the methods of the present disclosure. Thus, in an example, a method consists essentially of a combination of the steps of the methods disclosed herein. In another example, a method consists of such steps.

The following Statements described various examples of methods, uses, electrochemical cells and systems of the present disclosure:

Statement 1. A method for producing hydrogen and oxygen comprising: (i) oxidizing a mediator (e.g., redox intermediate) at a working electrode to yield an oxidized mediator (e.g., redox intermediate) and reducing protons or water at a counter electrode to yield hydrogen; and (ii) reducing an oxidized mediator at a working electrode to yield a reduced mediator (e.g., redox intermediate), and oxidizing water at a counter electrode to yield oxygen, where the oxygen generation may be performed simultaneously or non-simultaneously relative to the hydrogen generation and at the same or different current density, and where the oxidized mediator of (i) may be used as the oxidized mediator of (ii), or the mediator of (ii) may be used as the mediator of (i), and where the mediator may have a reversible redox potential lying outside the onset of the oxygen evolution reaction (OER) and/or the hydrogen evolution reaction (HER). The oxidizing and reducing can be carried out in any order.

Statement 2. A method according to Statement 1, where the mediator is a $H^+$ donor and/or acceptor.

Statement 3. A method according to Statements 1 or 2, where the mediator is chosen from ions such as, for example, Ce(III), Nd(III), Pr(IV), Pr(III), Pr(II), Co(III), Co(II), compounds comprising these ions, and the like, and combinations thereof.

Statement 4. A method according to any one of the preceding Statements, where the mediator has a reversible reduction potential lying in the range of +1.5 to +3.5 V vs SHE and/or a reversible oxidation potential lying in the range of +0.2 to +3.5 V vs SHE.

Statement 5. A method according to any one of the preceding Statements, where the mediator and the oxidized mediator are prevented from contacting the hydrogen and/or oxygen evolution electrode, respectively.

Statement 6. A method according to any one of the preceding Statements, where the mediator and/or the oxidized mediator are provided in an acidic, basic or buffered aqueous electrolyte.

Statement 7. A method according to any one of the preceding Statements, where the mediator and/or the oxidized mediator are provided in a non-aqueous electrolyte.

Statement 8. A method according to any one of the preceding Statements, where the mediator is provided in an electrolyte (e.g., an aqueous electrolyte), and the pH of the electrolyte remains substantially constant throughout (i) and/or (ii).

Statement 9. A method according to any one of the preceding Statements, where (ii) is performed first, followed by (i).

Statement 10. A method according to any one of the preceding Statements, further comprising collecting the produced hydrogen and/or oxygen.

Statement 11. A method according to any one of the preceding Statements, where (i) includes the recovery of the oxidized mediator and/or (ii) includes the recovery of the mediator.

Statement 12. An electrochemical cell comprising: a working electrode; a counter electrode; and optionally, a reference electrode, where the working electrode and the counter electrode may define an electrolyte space divided into a working electrode space and a counter electrode space by a permselective ion-conducting membrane, the cell further may further comprise an electrolyte (e.g., an aqueous electrolyte, a non-aqueous electrolyte, or a combination thereof) within the electrolyte space, where the aqueous electrolyte in the working electrode space of the electrolyte space contains a mediator, and the permselective ion-conducting membrane, if present, is at least or partly impermeable to the mediator and the mediator has a reversible redox wave lying outside the onset of the oxygen evolution reaction (OER) and/or the hydrogen evolution reaction (HER).

Statement 13. An electrochemical cell according to Statement 12, where the mediator is a $H^+$ donor and/or acceptor.

Statement 14. An electrochemical cell according to Statement 12 or 13, where the mediator is chosen from Ce(III), Nd(III), Pr(IV), Pr(III), Pr(II), Co(III), Co(II), compounds comprising these ions, and the like, and combinations thereof.

Statement 15. An electrochemical cell according to any one of Statements 12 to 14, where the mediator has a reversible redox wave lying in the range of +1.5 to +3.5 V vs SHE and/or a reversible oxidation potential lying in the range of +0.2 to +3.5 V vs SHE.

Statement 16. An electrochemical cell according to any one of Statements 12 to 15, where the mediator is provided in an acidic aqueous electrolyte.

Statement 17. An electrochemical cell according to any one according to Statements 12 to 16, where the pH of the electrolyte is in the range 0-14. The pH may depending on, for example, the mediator selected as some mediators operate in acids, some in base, and some in near-neutral electrolytes.

Statement 18. An electrochemical cell according to any one according to Statements 12 to 17, where the mediator is present in the working electrode space at a concentration in the range 0.1 M to 20 M (e.g., 0.1 to 10 M).

Statement 19. An electrochemical cell according to any one according to Statements 12 to 18, where the semi-permeable membrane is a proton exchange membrane (such as, for example, a Nafion®, sulfonated polystyrene, sulfonated poly(phenylene oxide), or an anion exchange membrane such as, for example, Fumasep® FAA anion exchange membranes, Sustanion® anion exchange membranes, and the like) or the like.

Statement 20. A method for producing hydrogen, the method comprising oxidizing a mediator at a working electrode to yield an oxidized mediator, and reducing protons at a counter electrode to yield hydrogen, and the mediator has a reversible redox wave lying outside the onset of the oxygen evolution reaction (OER) and/or the hydrogen evolution reaction (HER).

Statement 21. A method for producing oxygen, the method comprising reducing an oxidized mediator at a working electrode to yield a mediator, and oxidizing water at a counter electrode to yield oxygen and the mediator has a reversible redox wave lying outside the onset of the oxygen evolution reaction (OER) and/or the hydrogen evolution reaction (HER).

Statement 22. A method according to Statement 21 or 22, where the mediator is a $H^+$ donor and/or acceptor.

Statement 23. A method according to Statements 20 or 22, where the mediator is chosen from Ce(III), Nd(III), Pr(IV), Pr(III), Pr(II), Co(III), Co(II), compounds comprising these ions, and the like, and combinations thereof.

Statement 24. A method according to any one of Statements 20, 22, or 23, where the mediator has a reversible redox wave lying in the range of +1.5 to +3.5 V vs SHE and/or a reversible oxidation potential lying in the range of +0.2 to +3.5 V vs SHE.

Statement 25. A method according to Statement 21, where the oxidized mediator is chosen from Ce(IV), Nd(IV), Pr(IV), Pr(III), Co(IV), Co(III), compounds comprising these ions, and the like, and combinations thereof.

Statement 26. A method according to any one of Statements 20 to 22, where the mediator or the oxidized mediator is prevented from contacting the counter electrode.

Statement 27. A method according to any one of Statements 20 to 23, where the mediator and/or the oxidized mediator are provided in an acidic aqueous electrolyte.

Statement 28. A method according to any one of Statements 20 to 24, where the mediator is provided in an electrolyte (e.g., an aqueous electrolyte), and the pH of the electrolyte remains substantially constant throughout the oxidation or reduction process.

Statement 29. Use of a Ce(IV), Nd(IV), Pr(IV), Pr(III), Co(III), Co(IV), or a combination thereof as an electron acceptor in a method of generating oxygen from water and/or the use of a Ce(III), Nd(III), Pr(III), Pr(II), Co(II), Co(III), or a combination thereof as an electron donor in a method of generating hydrogen from water.

Statement 30. A use according to Statement 29, where the hydrogen and/or oxygen are generated in an electrochemical cell.

Statement 31. An energy storage system comprising: a charging unit configured to generate hydrogen and oxygen from water, where the charging unit includes a mediator and/or an oxidized mediator, a discharging unit configured to generate water from oxygen and hydrogen, a hydrogen storage unit in fluid communication with the charging unit and the discharging unit.

Statement 32. A system according to Statement 31, where the mediator is a $H^+$ donor and/or acceptor.

Statement 33. A system according to Statements 31 or 32, where the mediator is chosen from Ce(III), Nd(III), Pr(IV), Pr(III), Pr(II), Co(III), Co(II), compounds comprising these ions, and combinations thereof.

Statement 34. A system according to any one of Statements 31 to 33, where the mediator has a reversible redox wave lying in the range of +1.5 to +3.5 V vs SHE and/or a reversible oxidation potential lying in the range of +0.2 to +3.5 V vs SHE.

Statement 35. A system according to any one of Statements 31 to 34, where the oxidized mediator is chosen from Ce(IV), Nd(IV), Pr(IV), Pr(III), Co(IV), Co(III), compounds comprising these ions, and the like, and combinations thereof.

Statement 36. A system according to any one of Statements 31 to 35, where the charging unit comprises one or more electrochemical cell(s) of the present disclosure (e.g., one or more electrochemical cell(s) of any one of Statements 12 to 19).

Statement 37. A system according to any one of Statements 31 to 36, where the discharging unit comprises one or more proton exchange membrane fuel cell(s), alkaline fuel cell(s), solid oxide fuel cell(s), electricity generator(s), which may be on a hydrogen internal combustion engine, or the like, or a combination thereof.

The following examples are presented to illustrate the present disclosure. They are not intended to be limiting in any matter.

Example 1

This example provides a description of methods for producing hydrogen and oxygen, electrochemical cells, and systems of the present disclosure.

The synergistic hydrogen redox energy storage (SHRXES) system includes a charging subsystem based on a redox-mediated water-splitting device that stores energy in the form of hydrogen ($H_2$) and a discharging subsystem based on a polymer-electrolyte fuel cell (PEFC). As FIG. 1 shows, redox (RX) ions are cycled between an oxygen evolution cell (Stack I) and a hydrogen evolution cell (Stack II), effectively decoupling in time and space the two half-reactions of the water splitting process. This feature allows for the system to be designed and operated at different current densities in each of the stacks to maximize charging efficiency, while maintaining a low levelized cost of storage (LCOS). Furthermore, the energy and power components are decoupled and can be sized independently and adjusted on-demand to maximize the techno-economic benefits for power grids. The SHRXES system can leverage existing fuel-cell or flow-battery stacks and related balance-of-plant components to limit the need for additional power-related costs and enable fast deployment. The technology can also be implemented without geographical restrictions and can be deployed to idle with marginal energy losses over large periods of time. It is expected that a functional prototype will operate with >56% roundtrip efficiency and provide long-duration energy storage at a LCOS<4.6 ¢/kWh.

The long-duration energy storage (LDES) system relies on synergistic electrochemical energy-conversion devices that result in a cost-effective and energy-efficient LDES solution for over 100 h of storage duration at rated power. This synergistic hydrogen redox energy storage (SHRXES) system comprises (or is) a charging and discharging subsystem. The charging subsystem is a water-splitting device that stores energy in the form of hydrogen ($H_2$) using a redox (RX) mediated 2-step process. This approach can maximize efficiency and performance by exploiting the reduced performance requirements associated with the less frequent cycling required for LDES. The discharging subsystem uses $H_2$ in a fuel cell to generate electricity. Although power components in each of the subsystems may be operated with spatio-temporal independence, when considering their coupled operation, the SHRXES system functions as a closed-loop LDES device with only electricity as input and output.

The charging subsystem integrates two electrochemical stacks (Stack I and II). Stack I's anodic reaction involves the oxidation of water producing oxygen and protons. Protons migrate through a proton exchange membrane (PEM) to the cathode where the oxidized form of a redox ion ($RX_o$) is reduced to ($RX_r$). In stack II, $RX_r$ is oxidized to $RX_o$ in the anode, protons migrate through a PEM and are reduced in the cathode to hydrogen ($H_2$). Table 1 describes the redox reactions involved for the three RX ions that are expected to be useful, and compares them in terms of achievable cell potentials in each stack and cost of storage media. The RX ion selection and operation conditions, will dictate the power ratings of stack I and II. Although stack II consumes electricity and stores it in the form of chemical carriers ($RX_o$ and $H_2$), the operation of this stack may be reversed to produce electricity at high discharge efficiency during daily cycling. $H_2$ will be used as the long-term energy storage media to generate electricity in the discharging subsystem. A schematic representation of a SHRXES system operation is presented in FIG. 1.

The modular nature of the SHRXES system allows for the independent optimization of each of the power components (i.e. electrochemical stacks) and energy components (i.e. storage media selection) based on individual performance parameters, and the design of an optimal coupled system (i.e. sizing of power and energy units) will be informed by technoeconomic modeling under simulated grid conditions. This will ensure that the instant system achieves the minimum possible levelized cost of storage (LCOS). Additionally, there are multiple advantages of the system design in terms of its operation for LDES:

A SHRXES system can achieve high round-trip efficiency as each stack may be operated at an individually optimized power density. This is critical in the designs of Stack I and II, which require vastly different operation conditions. The water oxidation reaction (in Stack I) suffers from significantly lower voltage efficiencies than the proton reduction reaction (in Stack II). This implies that stack I needs to be designed to operate at a much lower current density than stack II to minimize energy losses. When designed properly, the combined system is expected to a have roundtrip efficiency over 56%, significantly outperforming competing hydrogen-based technologies such as, for example, regenerative fuel cells which exhibit roundtrip efficiencies between 30-50%.

A SHRXES system may involve two types of energy storage media (i.e. RX ions and $H_2$) with clearly differentiated cost/performance trade-offs. RX ions are a more expensive storage media than $H_2$, but they have higher energy conversion efficiency. This allows RX ions to be used for short-term/daily storage needs (running Stack II reversibly), while $H_2$ is stored for longer periods of time at a larger scale, as reflected in the different storage capacities of both chemical carriers.

LDES applications require large storage components and small power stacks. This system design requirement implies that the added capital cost from the multiple power stacks involved in a SHRXES system would be minimal and can easily be outweighed by the economic benefits arising from efficiency gains. Additionally, the integration of the multiple power system into a single SHRXES system will result in a reduce balance of system cost.

A SHRXES system may leverage existing FC or flow battery stacks and related balance of plant to limit the need for additional power-related costs and enable fast deployment.

While fully capable of performing intra-day, weekly, or even seasonal energy storage services, the SHRXES system does not have geographical restrictions (e.g., coupling with water reservoirs/terrain alterations, as in case of pumped-hydro storage units and the like, or coupling with gas-fired generators, as in case with compressed air storage units and the like) and does not depend on interfaces to other infrastructures (e.g., control of river basins, gas pipelines, etc.).

A SHRXES system is scalable and modular in terms of its energy and power ratings that can be recursively adjusted during its lifetime based on evolving needs of the power grid. Furthermore, the system does not impose any restriction on the ratio between the power and energy ratings (e.g., duration of charging) that enhances the ability to use this technology for various power grid services (e.g., spatiotemporal energy arbitrage, ancillary services, etc.).

A SHRXES system may be set up to idle with marginal energy losses for a substantial period of time (weeks, months) and be commissioned into operations remotely when power grid conditions justify it. This extends potential applications of this technology to capacity needs of infrequent, low-probability abnormalities in power grid operations caused by both technological (e.g., unforeseen outage or maintained of a large generator) and anthropogenic factors (e.g., natural disasters).

Figure 2:
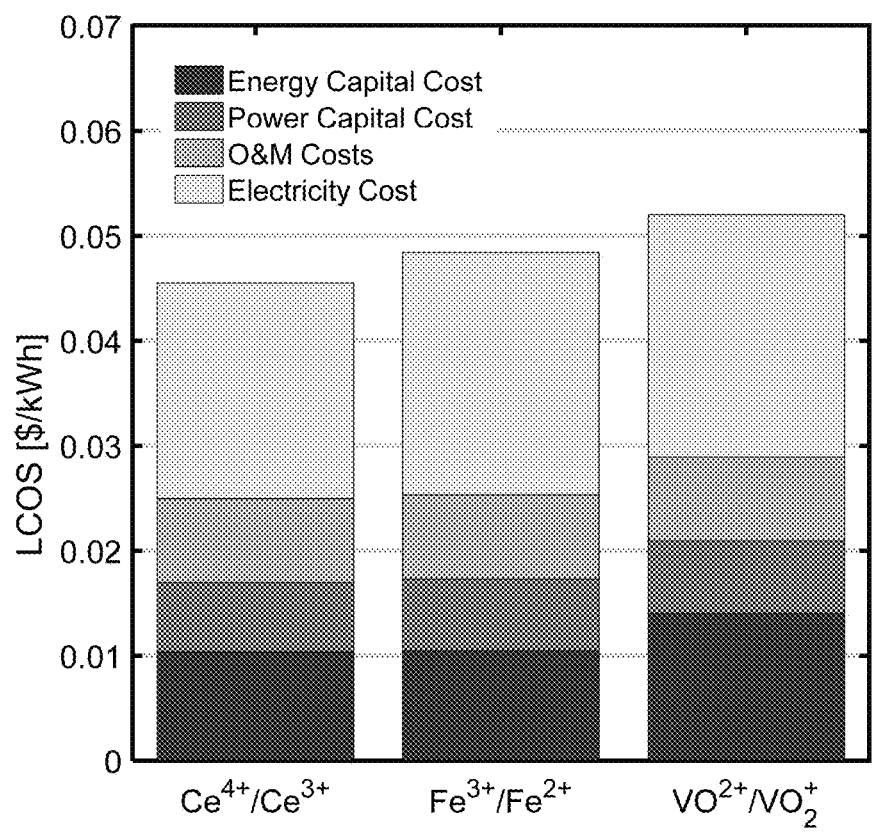
FIG. 2 is a graph of estimated LCOS for various RX ions.

Given the benefits of the SHRXES system, it is estimated that a LCOS<4.6 ¢/kWh can be achieved by optimizing the design and operation conditions. Estimated LCOS for each RX ion are presented in FIG. 2. These values were obtained based on the system's specifications and key assumptions presented in Table 1 and 2. These low LCOS estimates are achieved by optimizing the ratio between the active areas of stack I and II (a desirable ratio is equal to 2.3, reflecting a larger stack I that reduces the overpotential losses in the OER, increasing the charging efficiencies).

TABLE 1

| Summary of the SHRXES system specifications System Specifications | |
|---|---|
| Description | Response |
| System discharge and charge efficiency: | The charge efficiency depends on the type of RX species used: $Ce^{3+}/Ce^{4+}$ = 72%. The discharge efficiency is the efficiency of a fuel cell, which is usually around 60-75%. As there is a tradeoff between efficiency and power ratings |
| Target installed capital costs for energy and power components: | Energy: The capital costs are $100/kWh, $20/kWh, and $5/kWh for $VO^{2+}/VO_2^+$, $Ce^{3+}/Ce^{4+}$, and $Fe^{2+}/Fe^3$, respectively. The storage vessels for these RX species are made from polypropylene which has a cost of $0.26/L; the capital cost in $/kWh depends on the energy density of RX species (V = 0.03, Ce = 0.1, Fe = 0.1 [kWh/L]), resulting in a total cost for the containers $Ce^{3+}/Ce^{4+}$ = $5.60/kWh. Power: Stacks I and II consist of flow plates, electrodes, membranes, separators, frames, seals, and manifolds. The capital cost for these are $166/m². Depending on the operating power density of the RX species, the capital cost can be calculated accordingly. The fuel cell has a capital cost of $55/kW |
| | Energy-Related Specifications |
| Energy storage media: | RX solutions cost: The redox pair (RX) is cycled between its charged and discharged state in the production of hydrogen. A 1 kWh storage capacity for these redox species is assumed for this cycle. In addition to the RX species, supporting electrolytes, usually consisting of an acidic medium, are used to increase conductivity and solubility of RX species. $Ce^{3+}/Ce^{4+}$: Energy Density: 0.1 kWh/L, capital cost: $3/kWh, total cost: $3 Compressed Hydrogen: the cost of compressed hydrogen was not included in the LCOS calculations, as it is internally produced by the system and thus its contribution to the cost is already accounted for. |

TABLE 1-continued

Summary of the SHRXES system specifications System Specifications

| Description | Response |
|---|---|
| Energy storage containment and other key BOP: | RX species storage: A polypropylene storage vessel would be used with a capital cost of $0.26/L. This leads to the following needs: $Ce^{3+}/Ce^{4+}$: vessel size ~11.76 L, total cost: $3.06 Hydrogen gas storage (compressed at 30 bar): A stainless-steel storage vessel would be used, with a capital cost of $1.42/L, vessel size ~617 L, and total cost of $875. No compressor needed as $H_2$ can be produced at this pressure in stack II. |

Power-Related Specifications

| Description | Response |
|---|---|
| Core power conversion device: | Flow plates: Graphite or stainless steel, $35/m$^2$ Electrodes: Low loading Pt catalyst layers, $17/kW Membrane: Nafion 212, $75/m$^2$ Separators, fames, seals, and manifolds: $6/m$^2$ Hydrogen fuel cell: $55/kW |
| Power conversion BOP: | An inverter will be needed. Pumps (a total of 3): $224 each, $672/kW Control System: $700, $350/kW |

TABLE 2

Additional assumptions for LCOS calculations

| Item | Assumption |
|---|---|
| Energy storage capacity in the form of hydrogen | 100 kWh of energy storage was assumed in order to use a fuel cell with a rated power of 1 kW for 100 hours |
| RX Species storage capacity | A 1 kWh storage capacity for the redox species was chosen because the species is cycled continuously for the 24 hour charging cycle time. |
| Exchange current density for water splitting reactions ($i_{o,an/cat}$) | Oxygen evolution reaction (anode): 1.9 mA/cm$^2$ (25° C.) Hydrogen evolution reaction (cathode): 300 mA/cm$^2$ (25° C.) |
| Charge transfer coefficient ($\alpha_{an/cat}$) | Oxygen evolution reaction (anode): 0.257 (25° C.) Hydrogen evolution reaction (cathode): 0.5 (25° C.) |
| Reaction overpotential ($\eta_{an,cat}$) equation | $$\eta_{an/cat} = \frac{RT_{an/cat}}{\alpha_{an/cat}F}\mathrm{arcsinh}\left(\frac{i_{an/cat}}{i_{o,an/cat}}\right),$$ where $i_{an/cat}$ are the anodic/cathodic current densities, R is the ideal gas constant, and T is the stack temperature. |
| Conductivity | Nafion 212: 30 S/cm$^2$, thickness: 50.8 μm. |
| Charging cycle time | A daily charging cycle time was chosen to be able to accommodate some short-term power demands if necessary, which can be achieved through the reversibility of Stack II. |
| Total power/current in stacks I/II | The total power usage in Stacks I and II was assumed to be 1 kW. The total current was assumed to be 1 kW/1.23 V, which equals 813 A |
| O&M costs | The cost of hydrogen production and storage by an electrolyzer has been shown to be $2.57/kg of $H_2$. 9% of this cost comes from Operation and Maintenance of the system, which is about $0.2/kg of $H_2$ |

The SHRXES system is clearly differentiated from competing technologies as it offers an efficient solution to LDES with low-cost energy storage media and high round-trip efficiency. Table 3 compares attributes relevant to LDES of competing electrochemical energy storage technologies with those of the SHRXES system.

TABLE 3

Comparison of alternative electrochemical energy storage technologies and PSH.

| | PSH | Li-ion batteries | Flow batteries | Regenerative FC | SHRXES |
|---|---|---|---|---|---|
| Energy storage media cost | Low** | High*** | High*** | Low** | Low** |
| Power component cost | Medium/High†* | High*** | Low** | Low** | Low** |
| Round-trip efficiency | Medium/High* | High** | High** | Low*** | Medium/High* |
| Capable of LDES | Yes** | No*** | Yes** | Yes** | Yes** |
| Decoupled Energy/Power | Yes** | No*** | Yes** | Yes** | Yes** |

Figure 3:
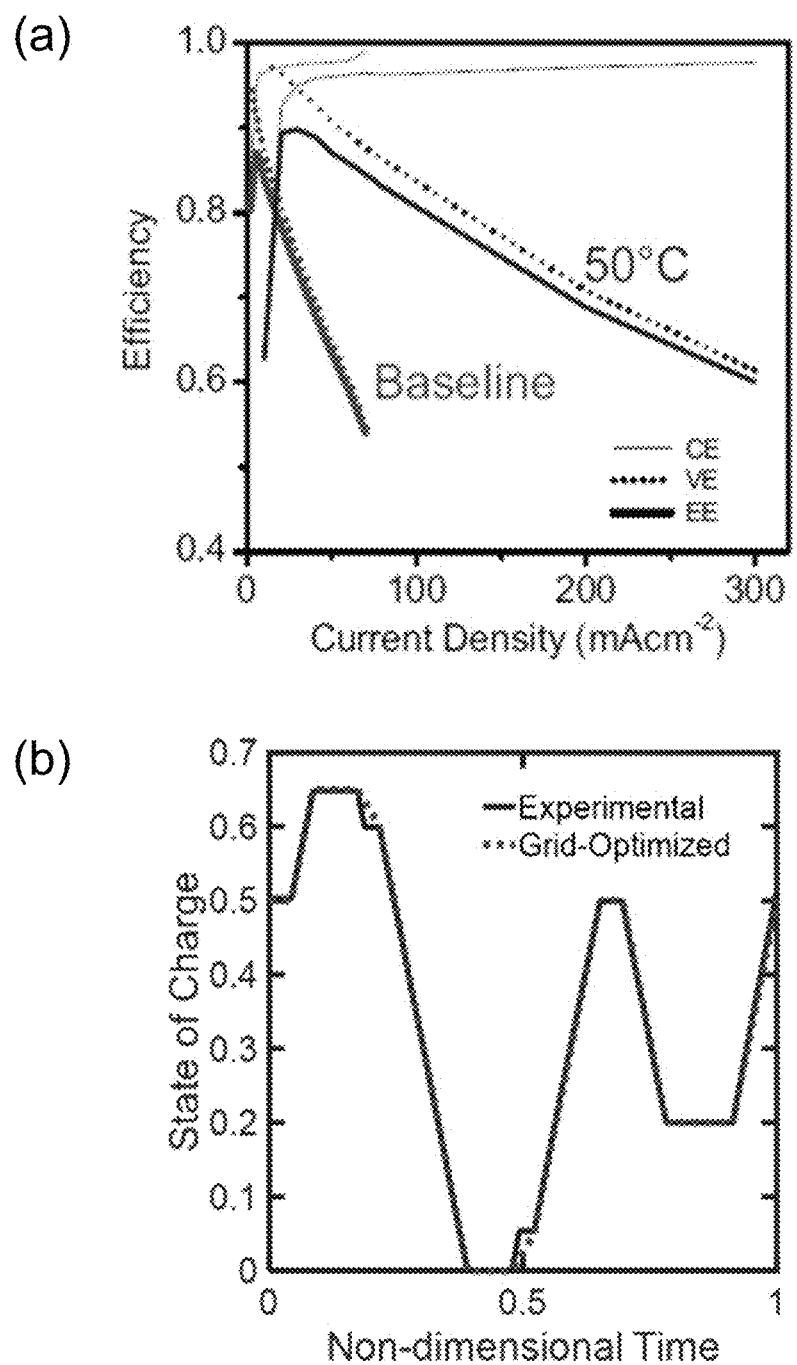
FIG. 3 are graphs showing (a) performance of stack II operated with $Ce^{3+}$ ions at room temperature (baseline) and 50° C. The results show the current (CE), voltage (VE) and energy conversion efficiencies (EE) as a function of current density. (b) Preliminary hardware-in-the-loop operation of 5 $cm^2$ stacks I and II with $Ce^{3+}/Ce^{4+}$ ions, show the ability of the SHRXES charging subsystem to follow optimized power-grid operation instructions from algorithms. Stack I was operated at a potential resulting in a positive electricity output, thus allowing the system to discharge. The time scale was normalized by the maximum time of the simulation (24 h) and the experiments (24 min). The experiments can be extended to longer times (e.g. >100 h).

†This cost can be prohibitively expensive if the construction costs are accounted for in the levelized cost of electricity supply.
*Light green
**Green
*Red While the SHRXES system is a new electrochemical energy storage system, some of its components have been investigated previously. The discharging subsystem is a $H_2$ PEM fuel cell, which has been researched extensively and optimal designs and configurations previously reported in the literature. In the charging subsystem, cerium RX ions have significant advantages because of the possibility to obtain a positive electricity output from stack I. This could result in arbitrage gains from injecting electricity into the grid when it is economically viable. These arbitrage gains in addition to the capacity value of long-term storage applications could be significant in case of intra-/inter-day and intra-/inter-seasonal electricity price fluctuations (e.g., driven by high penetration levels of renewable generation). Despite its advantageous properties, the implementation of $Ce^{3+}/Ce^{4+}$ redox reactions in energy storage systems is limited due to the low solubility of these species and low charge conversion efficiency. The latter problem is a combination of low faradaic efficiency in the oxidation reaction due to competition from water oxidation, low voltage efficiency, and mass-transport limitations at high current densities. We have demonstrated the ability to obtain modest current densities at high efficiencies from stack II when Ce ions are implemented (FIG. 3a), Lastly, the electrochemical cell involved in stack I has not been previously reported for any of the RX ions of interest. At a system's level, grid modeling identified possible economic gains from implementing a charging subsystem using $Ce^{3+}/Ce^{4+}$ ions and hardware-in-the-loop implementation demonstrated the ability to follow optimized power-grid operation instructions (FIG. 3**b).

It was demonstrated that energy storage units based on the SHRXES charging subsystem can incur a sufficient power grid value as providers of intra-day energy arbitrage, resiliency resources and the enabler of adaptive microgrids. In particular, this example demonstrated that the use of these storage units for microgrids during natural disaster can reduce potential power supply interruptions by 10.52%.

Example 2

This example provides a description of methods for producing hydrogen and oxygen and an electrochemical cell of the present disclosure.

Figure 5:
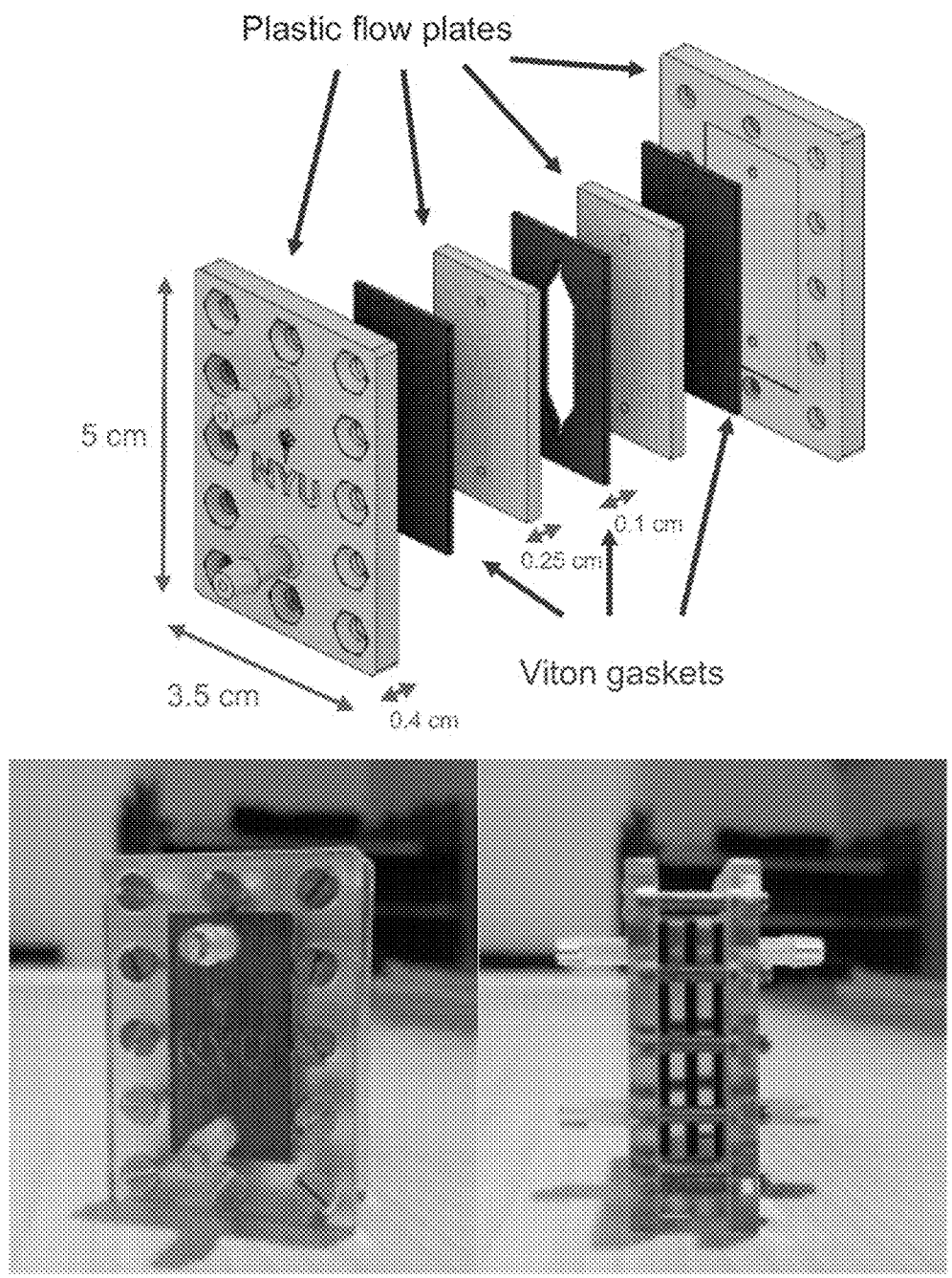
FIG. 5 shows an example of an electrochemical cell of the present disclosure.

FIG. 5 shows an example of an electrochemical cell of the present disclosure. FIGS. 6-9 show data related to production of hydrogen and oxygen using the electrochemical cell of FIG. 5.

Figure 6:
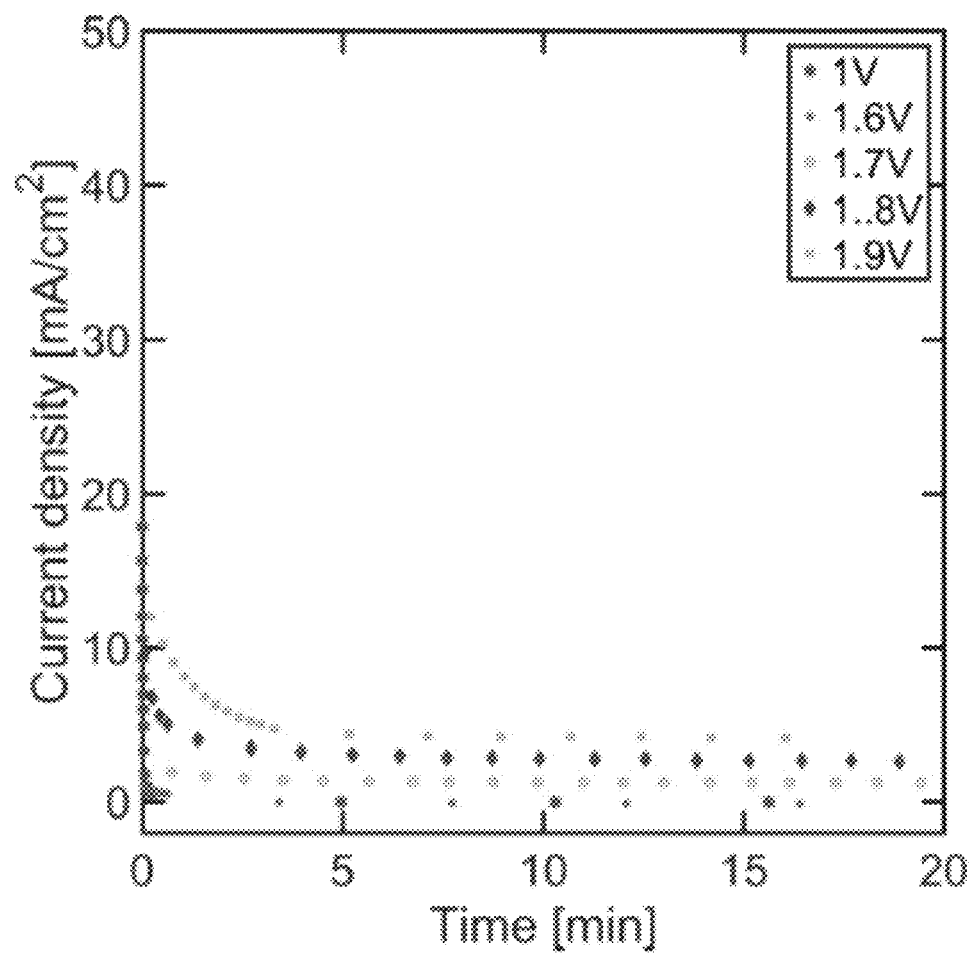
FIG. 6 shows chronoamperometry at 1, 1.6, 1.7, 1.8, and 1.9 V using a cell of FIG. 5. Platinized titanium mesh as cathode and anode. Anolyte: 80 mM Ce(III) carbonate in 2M MSA. Catholyte: 2M MSA. Room temperature.
Figure 7:
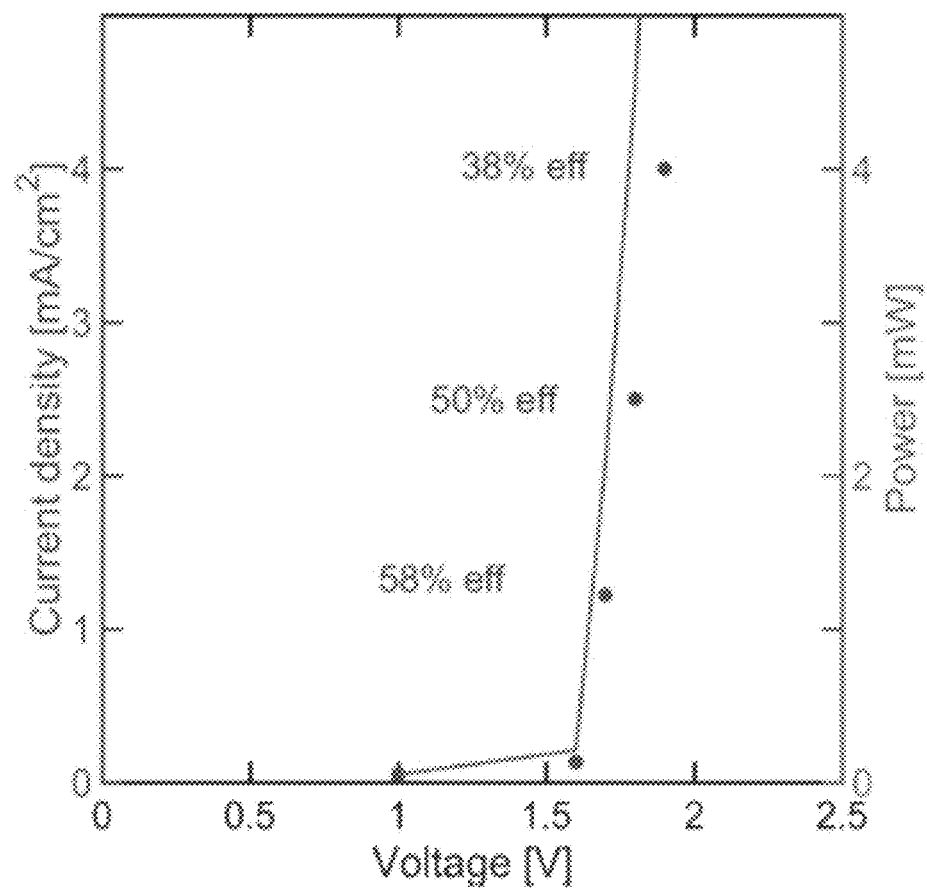
FIG. 7 shows steady state current density, power density, and Faradaic efficiencies at different voltages using a cell of FIG. 5. Platinized titanium mesh as cathode and anode. Anolyte: 80 mM Ce(III) carbonate in 2M MSA. Catholyte: 2M MSA. Room temperature.

For the experiments used to generate the data in FIGS. 6 and 7, an electrochemical cell of FIG. 5 was used with Ce(III) carbonate solution flowing into the anodic side and acid flowing into the cathodic side. For the Ce(III) oxidation experiments, 80 mM Ce(III) carbonate in 2M MSA was used as the anolyte and 2M MSA was used as the catholyte. Both electrodes were platinum gauze (size of 100 mesh). Both solutions had a flow rate of 1.35 mL/min and the experiments were run at room temperature.

FIG. 6 shows the time dependent current density, while FIG. 7 shows steady state current density. The power density was calculated by multiplying the current density by voltage. The Faradaic efficiency was determined using Faraday's law with redox titration of the generated Ce(IV) with Fe(II) sulfate.

Figure 8:
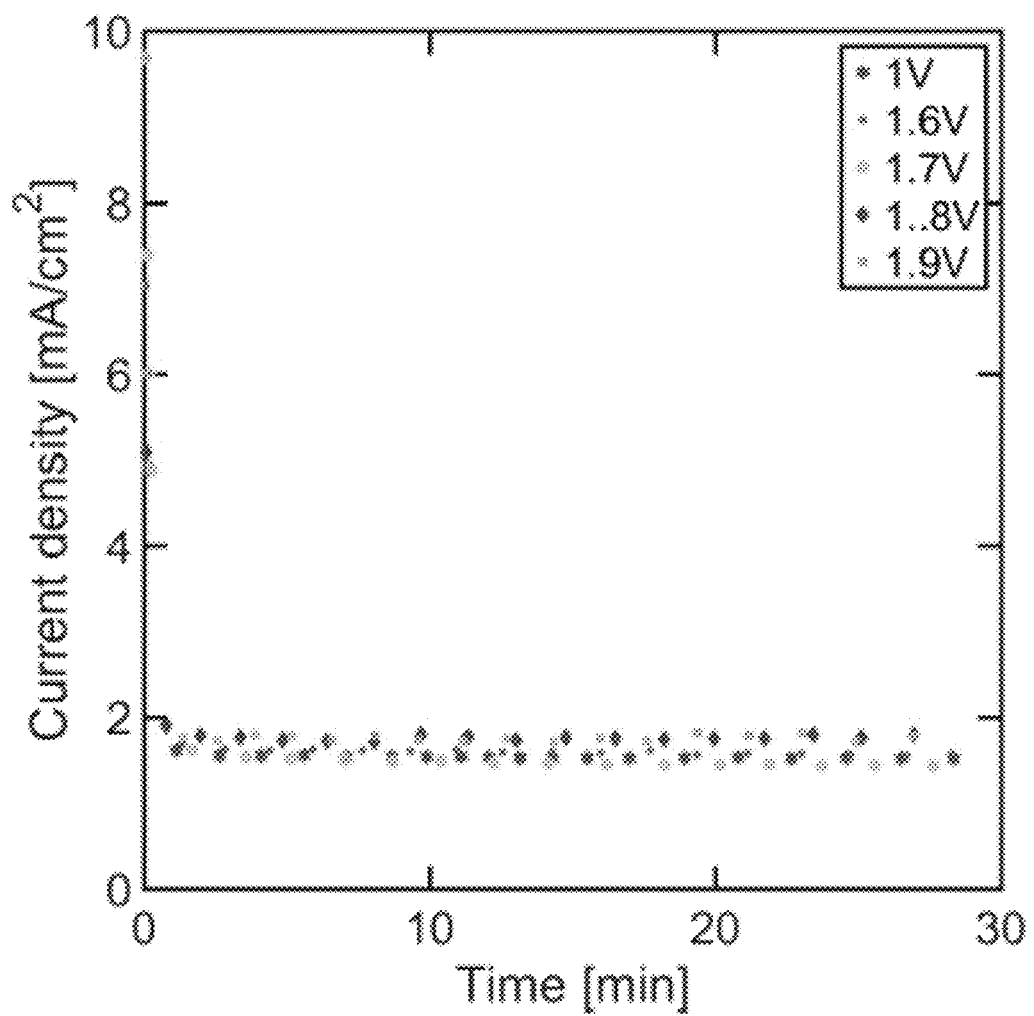
FIG. 8 shows chronoamperometry at 1, 1.6, 1.7, 1.8, and 1.9 V using a cell of FIG. 5. Platinum mesh as cathode and anode. Catholyte: 80 mM Ce(IV) sulfate in 4M MSA. Anolyte: 4M MSA. Room temperature.
Figure 9:
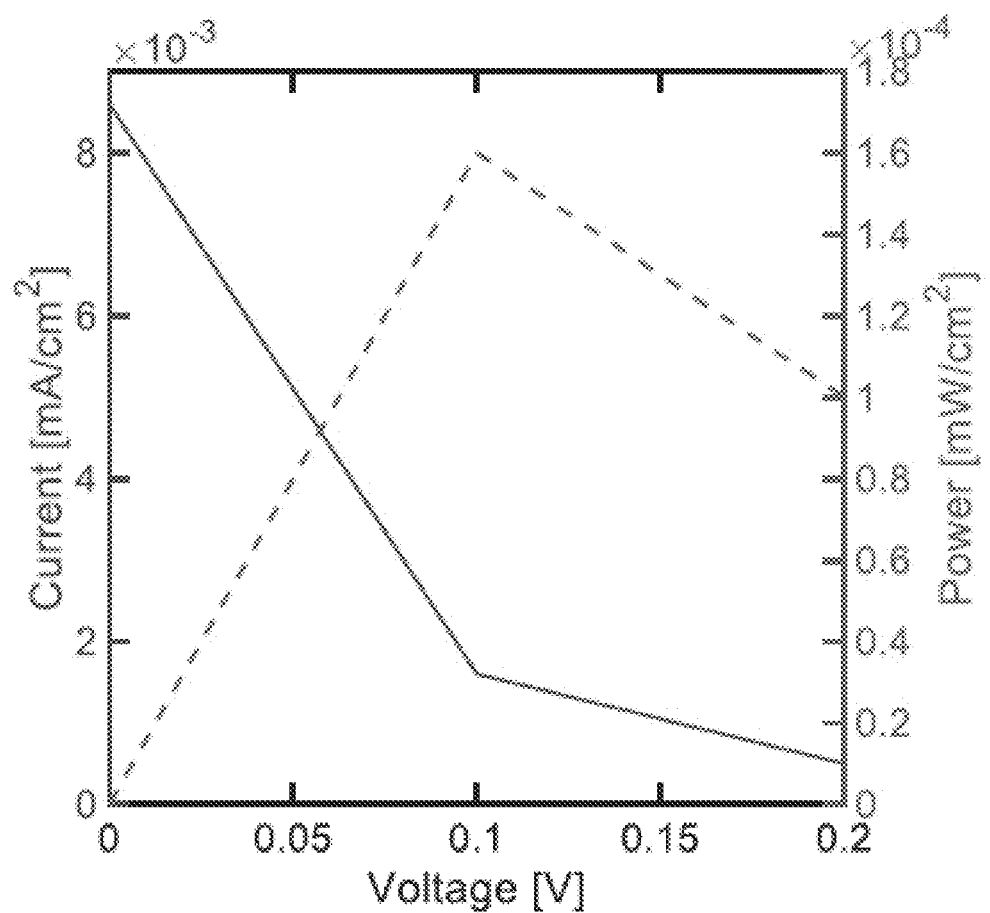
FIG. 9 shows steady state current density and power density at different voltages using a cell of FIG. 5. Platinum mesh as cathode and anode. Catholyte: 80 mM Ce(IV) sulfate in 4M MSA using a cell of FIG. 5. Anolyte: 4M MSA. Room temperature.

For the experiments used to generate the data in FIGS. 8 and 9, an electrochemical cell of FIG. 5 was used with Ce(IV) sulfate solution flowing into the cathodic side and acid flowing into the anodic side. For the Ce(IV) reduction experiments, 80 mM Ce(IV) sulfate in 4M MSA was used as the catholyte and 4M MSA was used as the anolyte. Both electrodes were platinum gauze (size of 100 mesh). Both solutions had a flow rate of 1.35 mL/min and the experiments were run at room temperature. FIG. 8 shows the time dependent current density, while FIG. 9 shows steady state current density. The power density was calculated by multiplying the current density by the voltage.

Example 3

This example provides a description of methods for producing hydrogen and oxygen, electrochemical cells, and systems of the present disclosure.

A cerium-mediated decoupled electrolysis system that produces hydrogen and stores energy in redox couples is described. Electrochemical studies were performed to observe the effects of diffusive transport, convective transport, and thermal effects on the system. A technoeconomic analysis was also done, focusing on the optimization of the system operation and identifying target operation parameters to achieve hydrogen production at a lower cost than that of PEM electrolysis. This concept was demonstrated by introducing a decoupled water-splitting device with Ce(III)/Ce(IV) ($E^0$=1.5-1.7V) as a redox shuttle, the effects of diffusive transport, convective transport, and thermal effects on the operation of the system were investigated, and then the scheduling of the system operation was developed to minimize the hydrogen production cost. The findings provide a basis for low-cost electrochemical hydrogen production.

Figure 10:
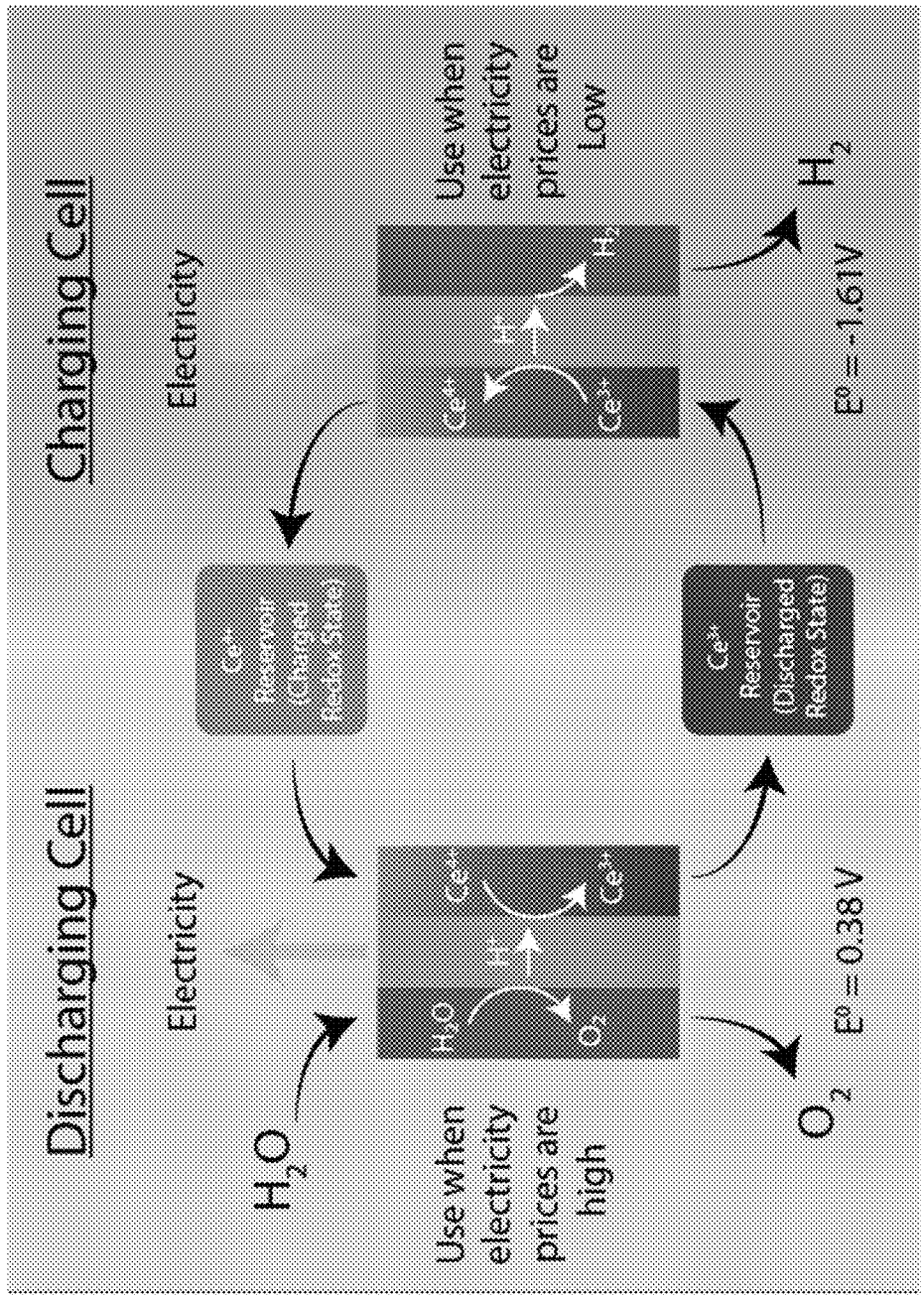
FIG. 10 shows a diagram of an example of a system design. On the left is the discharging cell and the right is the charging cell.

Dual-function Ce-mediated water splitting device. The energy storage system is depicted in FIG. 10 and is composed of two separate electrochemical cells: a charging (or HER) cell and a discharging (or OER) cell coupled by a Ce(III)/Ce(IV) redox shuttle. In this configuration, the HER compartment is an electrolytic cell with a standard potential ($E^0$) between −1.5 and −1.7 V while the OER compartment is a galvanic cell with $E^0$=0.27 to 0.47 V. This bidirectional flow of energy results in a dual-function device capable of providing energy storage to the grid while at the same time generating $H_2$ as a fuel. The following discusses the effects of redox species concentration, convective transport, and thermal effects on the performance of the device, and ultimately identify optimal operating conditions for implementation.

Effects of Ce(III)/Ce(IV) concentration in device performance. During the course of operation of the system, the concentration of Ce(III/IV) varies as the charging and discharging cells oxidization and reduce Ce, respectively. These dynamic changes in concentration can affect the overpotential and the faradaic efficiency (FE) of the redox reactions. This is particularly important for the anodic reaction of the HER compartment, where Ce(III) oxidation competes with the OER reaction. At lower concentrations of Ce(III), the mass transport rate of the Ce ions decreases, which is expected to lead to an increase in OER and a lower FE for Ce oxidation. For this reaction, the FE is defined as:

$$FE = \frac{\text{Current participating in Ce oxidation}}{\text{Total Current}}$$

Figure 11:
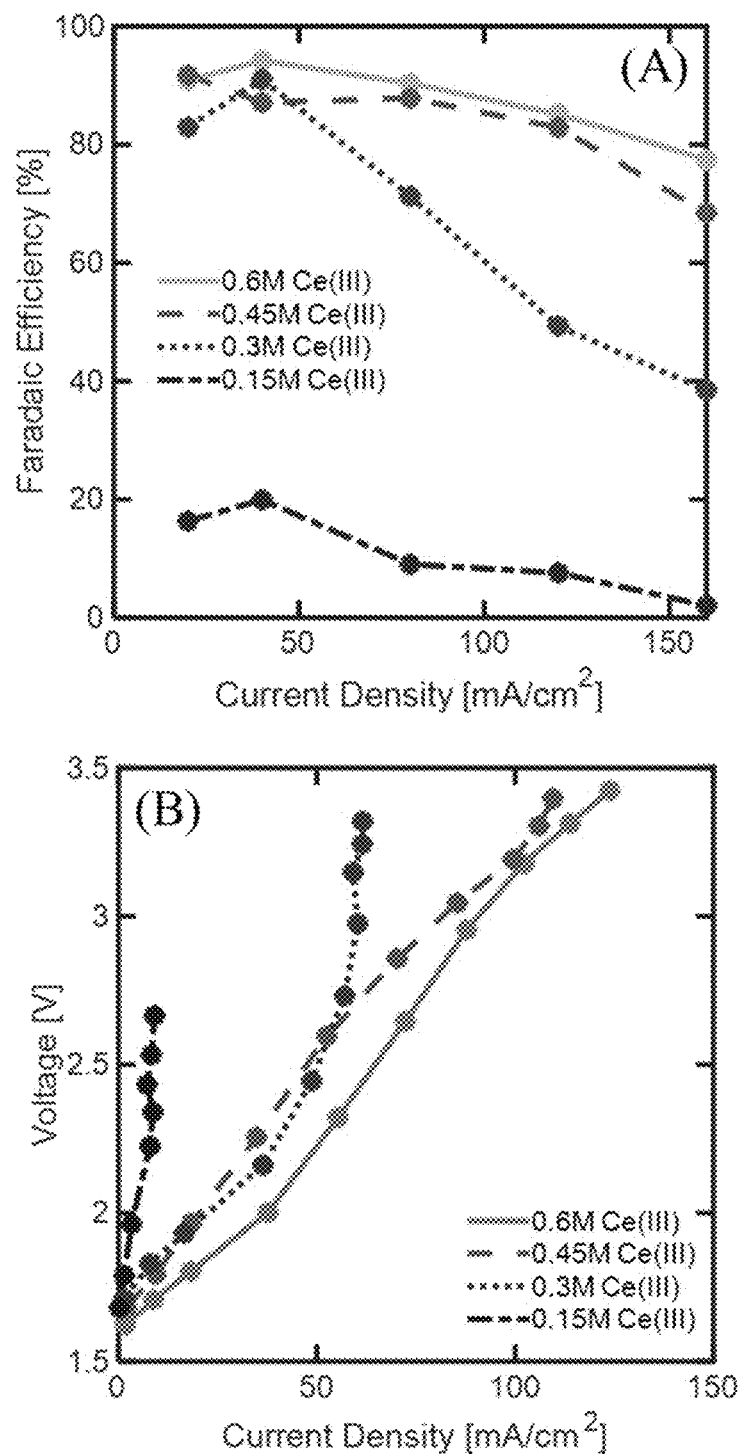
FIG. 11 shows (A) Faradaic efficiency with charging current density for various concentrations. (B) Polarization curves for the charging cell for various concentrations. The graph shows partial current densities for Ce(III) oxidation. (C) Polarization and power curve for the Discharging cell for various concentrations. Charging cell and discharging cell run at 5 mL/min and room temperature.
Figure 11:
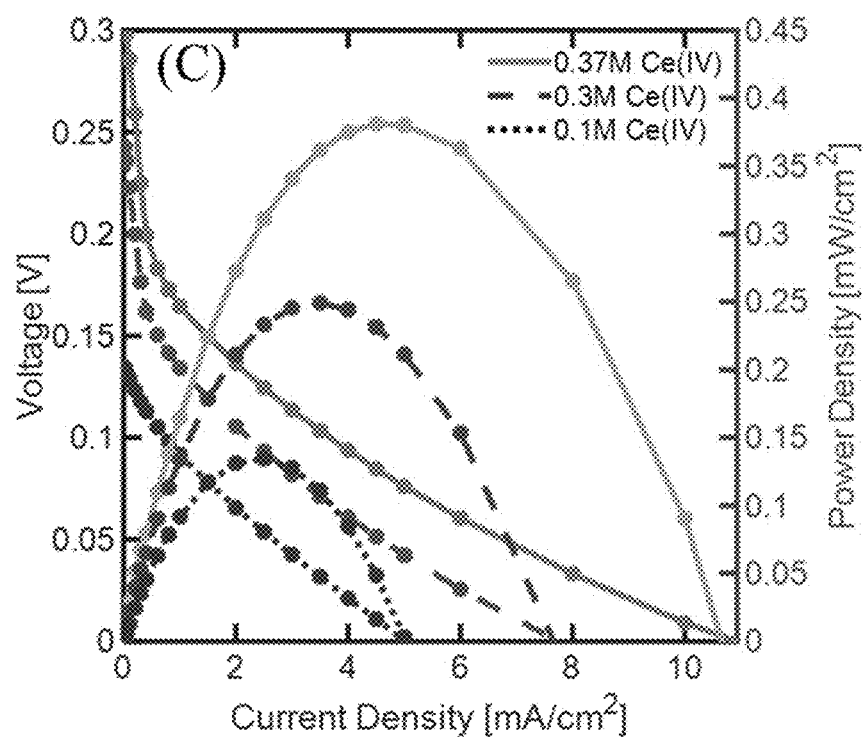

In the experiments, 0.6M Ce(III) in 4M MSA was the highest concentration accessible, given the low solubility of these redox ions in aqueous electrolytes. For the following experiments, the concentration of Ce(III) or Ce(IV) was varied and polarization curves were obtained. In addition, the FE for the charging cell was calculated at various concentrations and current densities. As shown in FIG. 11(A), the decrease in FE with lower Ce(III) concentrations suggests mass transport limitations of the redox ions to the surface of the anode. This effect is most drastic when the concentration of Ce(III) was lowered from 0.3M to 0.15M resulting in a decrease in FE of at least 75% at all the current densities, as the OER started to dominate. In a similar way, the FE decreased as the current density increased, further confirming that the depletion rate of Ce(III) ions could not be fully compensated by its diffusive replenishment from the bulk.

The partial current densities for Ce(III) oxidation are presented as a function of potential in FIG. 11(B) (polarization curves for total currents are described herein). For concentrations between 0.6-0.45 M Ce(III), the partial current densities increased linearly with voltage, indicating that the limiting currents were not reached within the operating conditions tested in this example. On the other hand, for Ce(III) concentrations of 0.15 and 0.3M Ce(III), the limiting currents were observed near 10 and 60 mA/cm$^2$, respectively.

In the case of the discharging cell, the Ce(IV) reduction rate can be affected by the concentration of the redox ions due to both transport and electrode kinetic effects. As observed in FIG. 11(C), decreasing the concentration of Ce(IV) lead to a decrease in the cell output power. It is important to point out that the FE of the Ce(IV) reduction approached 100%, as the operating potentials were not sufficient to promote the HER reaction in the cathodic side of this cell. These results underscore the importance of dynamically monitoring the concentration of redox species, as the performance of the charging and discharging cells can change drastically at different Ce concentrations.

Figure 12:
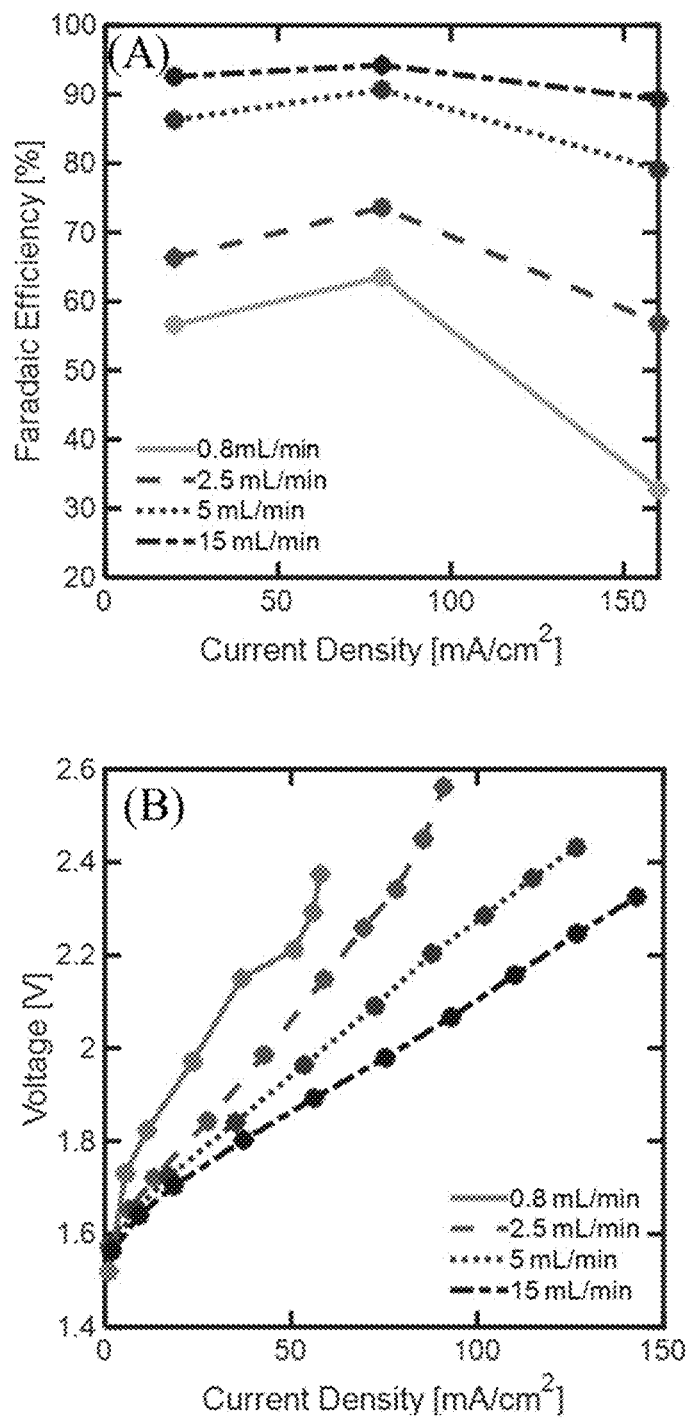
FIG. 12 shows (A) Faradaic efficiency with charging current density for various flow rates. (B) Polarization curves for the charging cell for various flow rates in terms of the partial current density for Ce(III) oxidation. (C) Polarization and power curve for the discharging cell for various flow rates. Charging cell run with 0.6M Ce(III) at room temperature. Discharging cell run with 0.35M Ce(IV) at room temperature.
Figure 12:
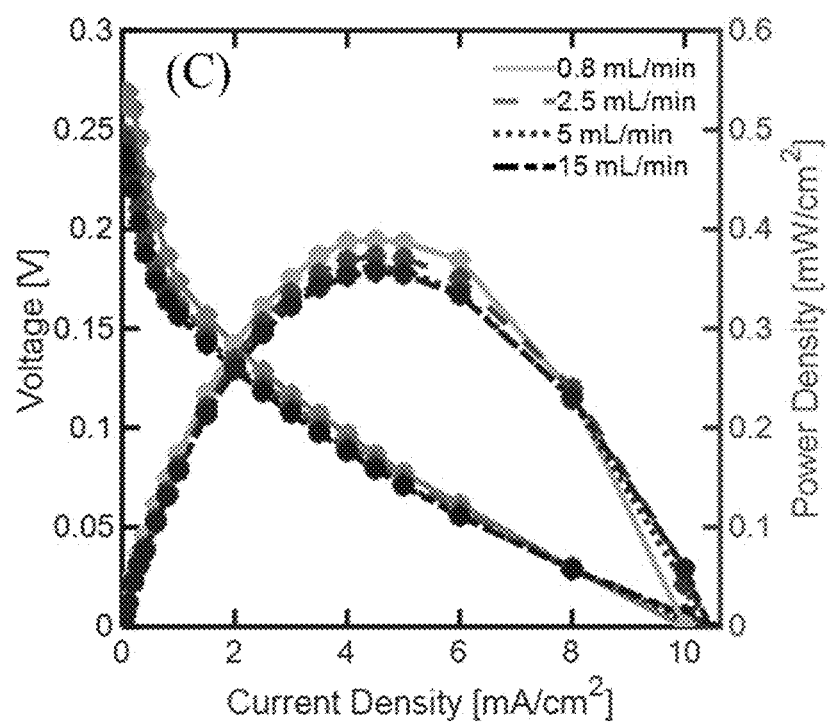

Improving cell performance by enhancing convective transport. Increasing the convective transport can increase the flux of Ce ions to the surface of the electrode by reducing the width of the diffusion layer. In these experiments, the flow rate of the Ce solution was varied to study the effects of convective transport. FIG. 12(A) shows the effects of flow rate on the FE of Ce(III) oxidation for the charging cell with a Ce(III) concentration of 0.6M. As the flow rate increased, the FE was improved across all current densities. This indicates that convective transport improved the ability of Ce(III) to diffuse quickly to the electrode surface. The faster convective transport wasn't thought to improve the OER due to water already saturating the electrode surface. The polarization curves in FIG. 12(B) also show that partial current densities for Ce oxidation increase with flow rate at a given potential. For 0.8 mL/min, mass transport limitations appear to have begun near 50 mA/cm$^2$. In addition, a slight increase in slope of the 2.5 mL/min partial polarization curve appears at around 80 mA/cm$^2$, indicating the beginning of mass transport limitations. These results are consistent with the improved mass transport rates expected at higher flow rates. These effects are less important in the case of the discharging cell (FIG. 12(C)), in which current densities are low and transport processes do not appear to limit the Ce(IV) reduction reaction.

Figure 13:
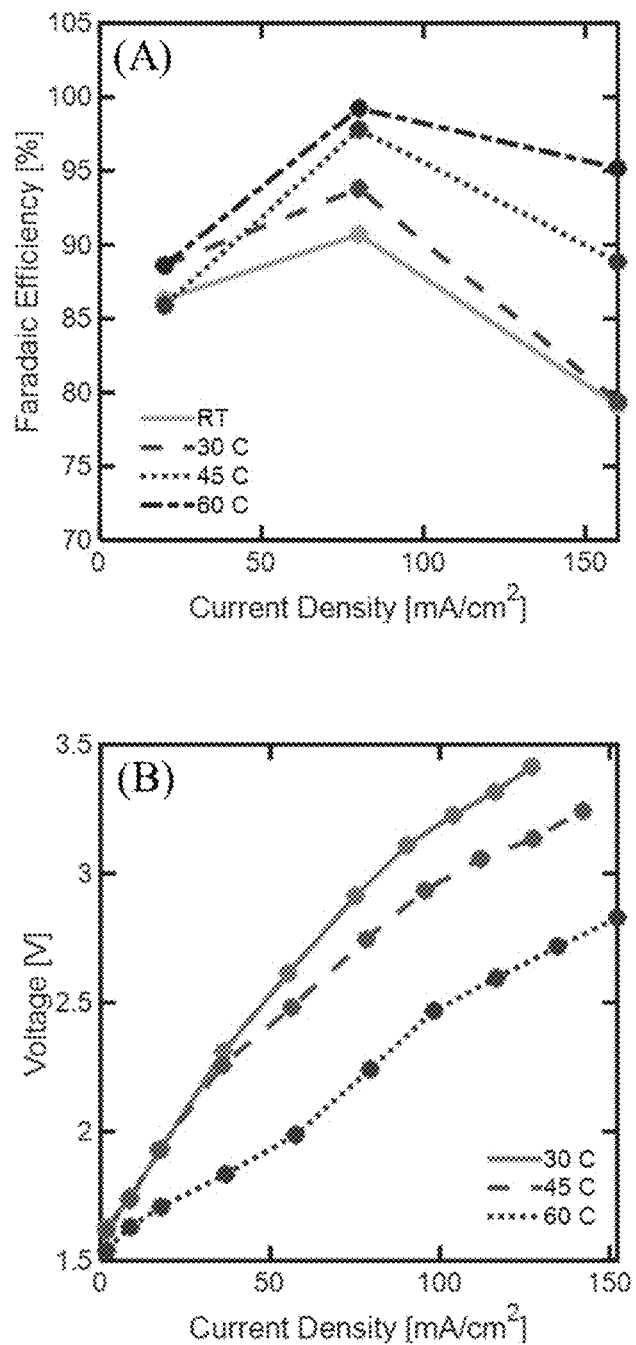
FIG. 13 shows (A) Faradaic efficiency with charging current density for various temperatures. (B) Polarization curves for the charging cell for various flow rates in terms of the partial current density for Ce(III) oxidation. (C) Polarization and power curve for the Discharging cell for various temperatures. Charging cell run with 0.6M Ce(III) at 5 mL/min. Discharging cell run with 0.35M Ce(IV) at 5 mL/min.
Figure 13:
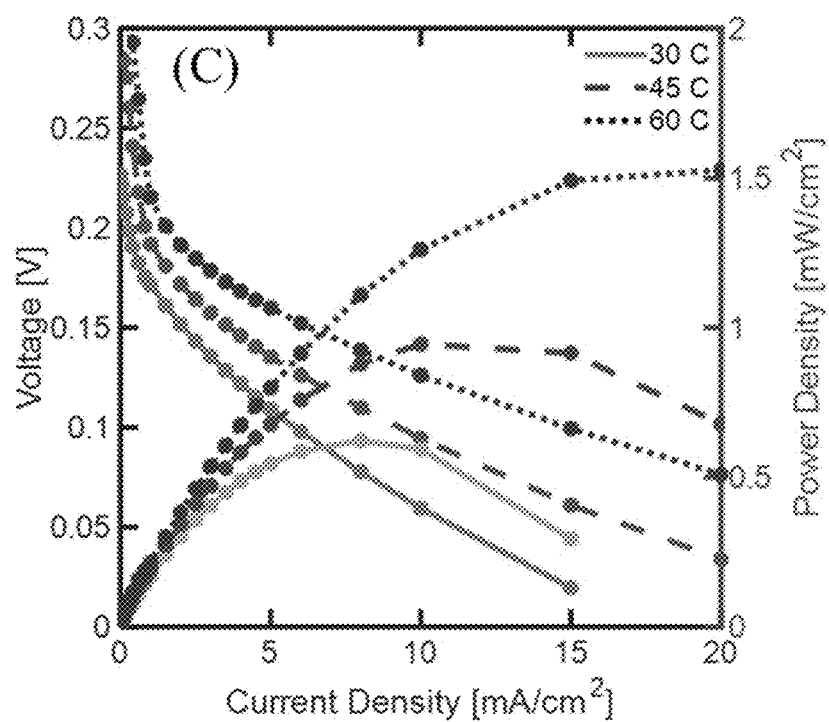

Thermal effects on cell performance. Thermal effects play a key role in electrochemical processes similarly to homogeneous reactions. Higher temperatures can lead to improved mass transport as well as lower reaction overpotentials. In the case of the charging cell, an increase in temperature can both accelerate the rate of the Ce(III) oxidation reaction and OER. The results show that the when temperature was increased from 30° C. to 60° C., the FE towards Ce(III) increased monotonically (FIG. 13(A)), implying that Ce(III) oxidation had a higher thermal sensitivity than the OER. The improved performance with temperature was also evident from the increased partial current densities at a given potential, as observed in FIG. 13(B). For the discharging cell, the performance also increased with an increase in temperature (FIG. 13(C)). At 60° C., the highest power density achieved was 1.5 mW/cm$^2$, a 400% improvement over the performance at room temperature. These observations, combined with the flow rate and concentration effects in the Ce(IV) reduction reaction, suggest that this reaction is kinetically limited and improvements in electrocatalysis can help to achieve higher power densities.

Optimization of Scheduling of Charging and Discharging Cycles. The decoupled nature of the Ce-mediated H$_2$ production system is hypothesized to allow the system to take advantage of fluctuating energy prices in renewable energy rich grid environments, and therefore decrease the cost of producing hydrogen compared to a conventional electrolyzer. Therefore, an economic assessment was performed involving the optimization of charge/discharge scheduling and system sizing, a sensitivity analysis, and a comparison to a conventional electrolysis to provide design targets for this type of system. The assessment is based on the calculation of the cost of H$_2$ production, $C_{H2}$, in US$ per kg of H$_2$. This calculation is based on the optimization of the size of the system components as well as on the optimization of the scheduling of charge/discharge cycles. The size optimization was based on a window of operating parameters that were derived from the technical performance of the cell (as detailed in this example), and cost data for the stack and tank components were obtained from similar electrochemical systems (Table 4).

Figure 14:
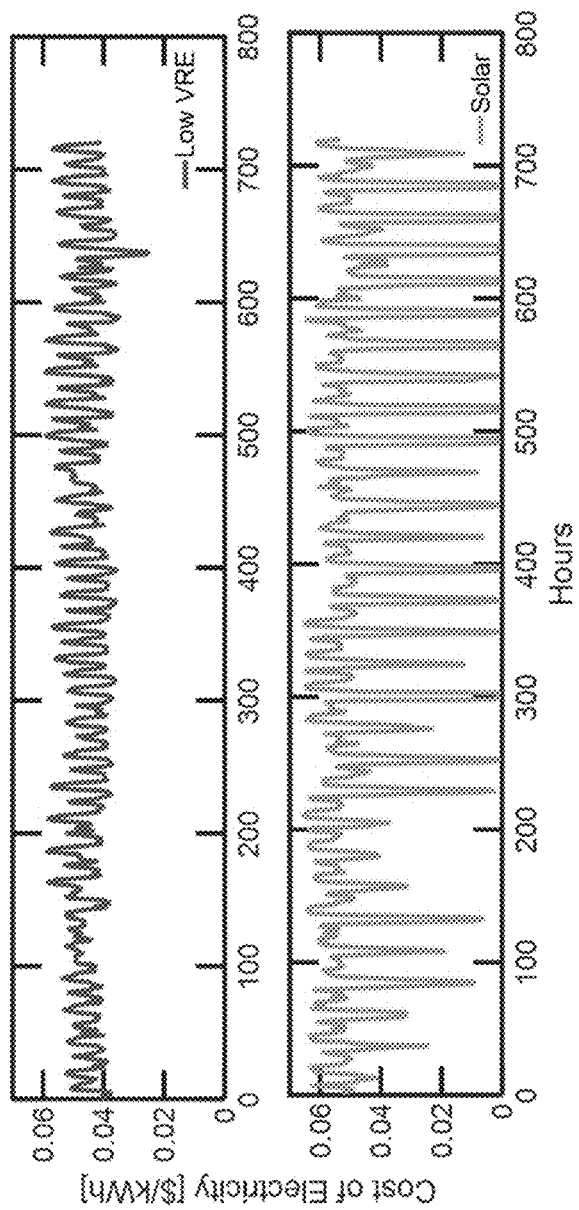
FIG. 14 shows an example of the hourly price of electricity over the first 30 days of the year for the Low VRE (top) and the High Solar (bottom) renewable energy scenarios.
Figure 15:
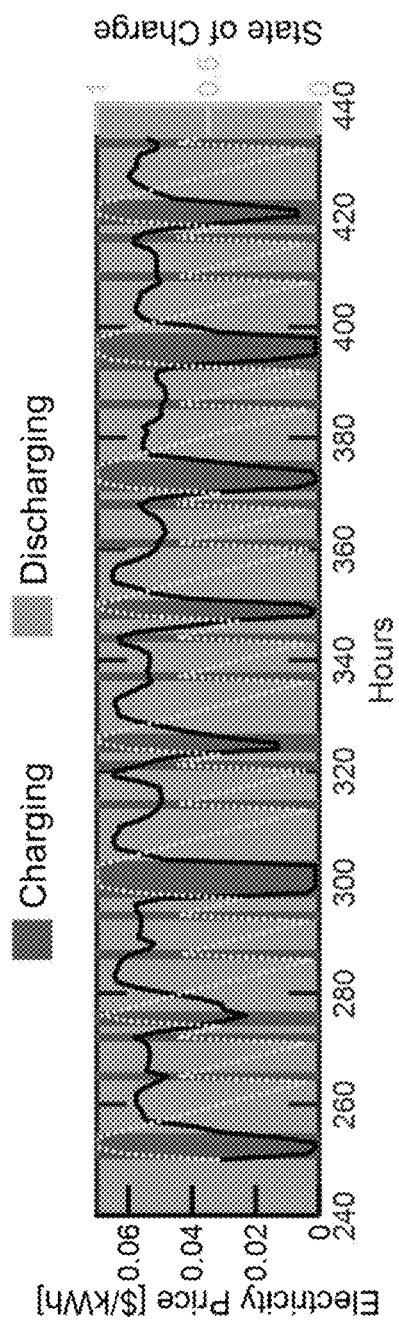
FIG. 15 shows charging and discharging behavior of the system for a High Solar scenario for an arbitrary 140 hour prior of operation.

Hourly electricity price data of the California Independent System Operator (CAISO) was obtained from Seel et al. for four scenarios with different degrees of renewable energy penetration. The four scenarios were Low Variable Renewable Energy (VRE) (7% wind, 14% solar), Balanced (20% wind, 20% solar), High Wind (30% wind, 10% solar), and High Solar (10% wind, 30% solar). The price variability due to Low VRE and High Solar is presented in FIG. 14. The Low VRE scenario shows much less variability compared to that of the High Solar scenario, indicating that the High Solar scenario could be more advantageous when implementing the system. As an example of how the system operates, FIG. 15 shows an optimal scheduling of the charging and discharging cells under the High Solar scenario; it is important to consider that under an optimal operation, only one of the cells is active at a time. As anticipated, optimizing scheduling shows charging cycles during periods of low electricity prices while discharging cycles occur when the prices surge. The maximum length of the charging and discharging cycles is determined by the storage capacity of the Ce solution and the operating currents of the cells. If a system is designed with large storage capacity, longer cycles can be sustained before the Ce(III) or Ce(IV) ions are fully depleted. Similarly, as the operating currents of each cell increases, the maximum operation cycle decreases, given the increased rate of consumption of redox species. These capacity limitations are evident in FIG. 15, as there are periods of time when the system operation appears to change from discharging to charging at high electricity prices. Prior to these seemingly sub-optimal changes, the concentration of Ce(III) or Ce(IV) are fully depleted, prompting the alternating operation of the cells. The state-of-charge (SoC) of the electrolyte is shown for improved clarity on this point.

TABLE 4

Parameters used in the technoeconomic model. Upper and lower bounds are provided for optimization parameters $j_{Ch}$, $A_{Ch}$, and V.

| Parameter | Value or Range |
|---|---|
| Charging Current Density [$j_{Ch}$] | 50-150 mA/cm$^2$ |
| Discharging Current Density [$j_{Dis}$] | 25 mA/cm$^2$ |
| Charging/Disscharging Area Ratio [$A_{Ch/Dis}$] | 0.25-3 |
| Volume of tank/Discharging Area Ratio [$V_{Ce}$] | 0.025-0.5 m |
| Capital Cost [$C_{Cap}$] | $2000/m$^2$ |
| Electrolyte Cost [$C_{sol}$] | $0.3/L |
| Tank Cost [$C_{tank}$] | $0.26/L |
| Discount rate [r] | 0.05 |

Figure 16:
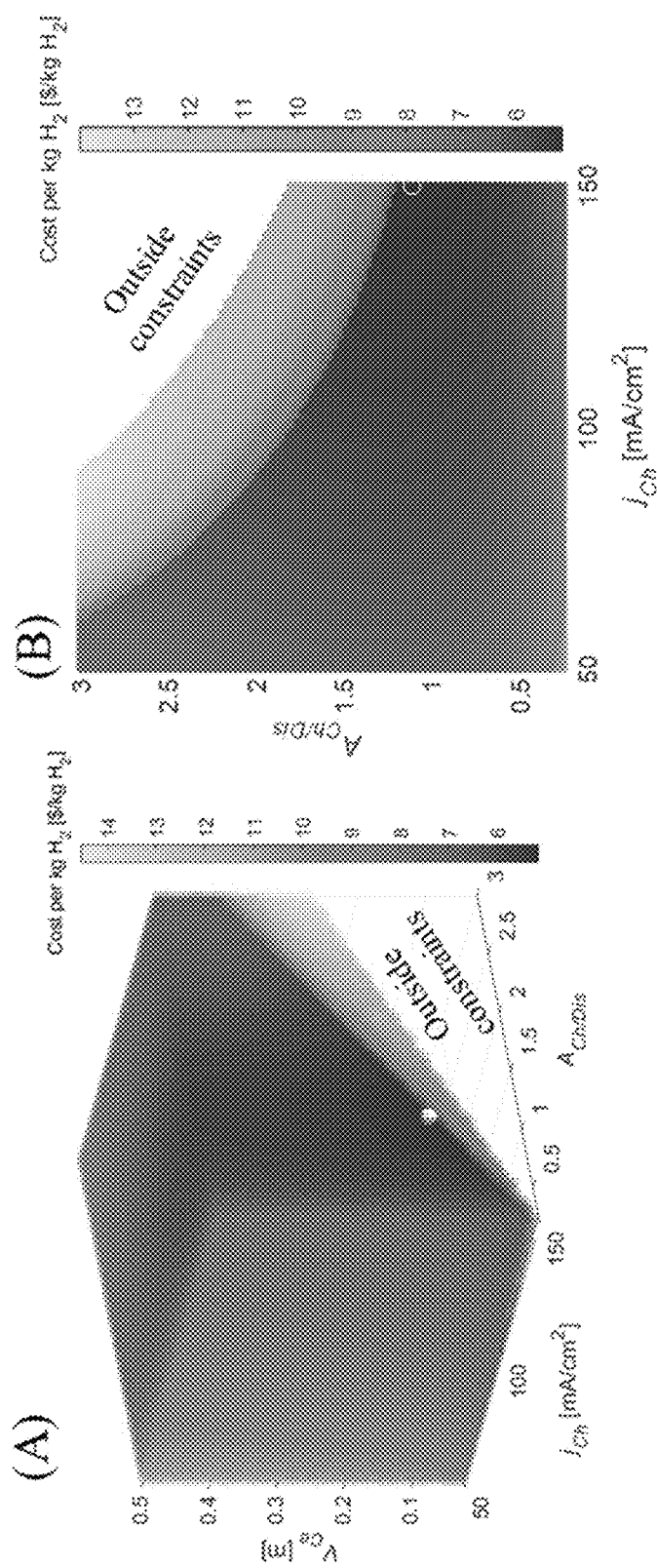
FIG. 16 shows an example of optimization of three parameters, charging current density ($j_{Ch}$), charging area to discharging area ratio ($A_{Ch/Dis}$), and volume to discharging area ratio ($V_{Ce}$). (A) 3-D optimization space with optimal point in white. (B) 2-D optimization plane for $j_{Ch}$ and $A_{Ch/Dis}$. (C) 2-D optimization plane for $j_{Ch}$ and $V_{Ce}$. (D) 2-D optimization plane for $A_{Ch/Dis}$ and $V_{Ce}$. Empty parts of graph do not fit within the constraint that the concentrations of Ce(III) and Ce(IV) must be positive.
Figure 16:
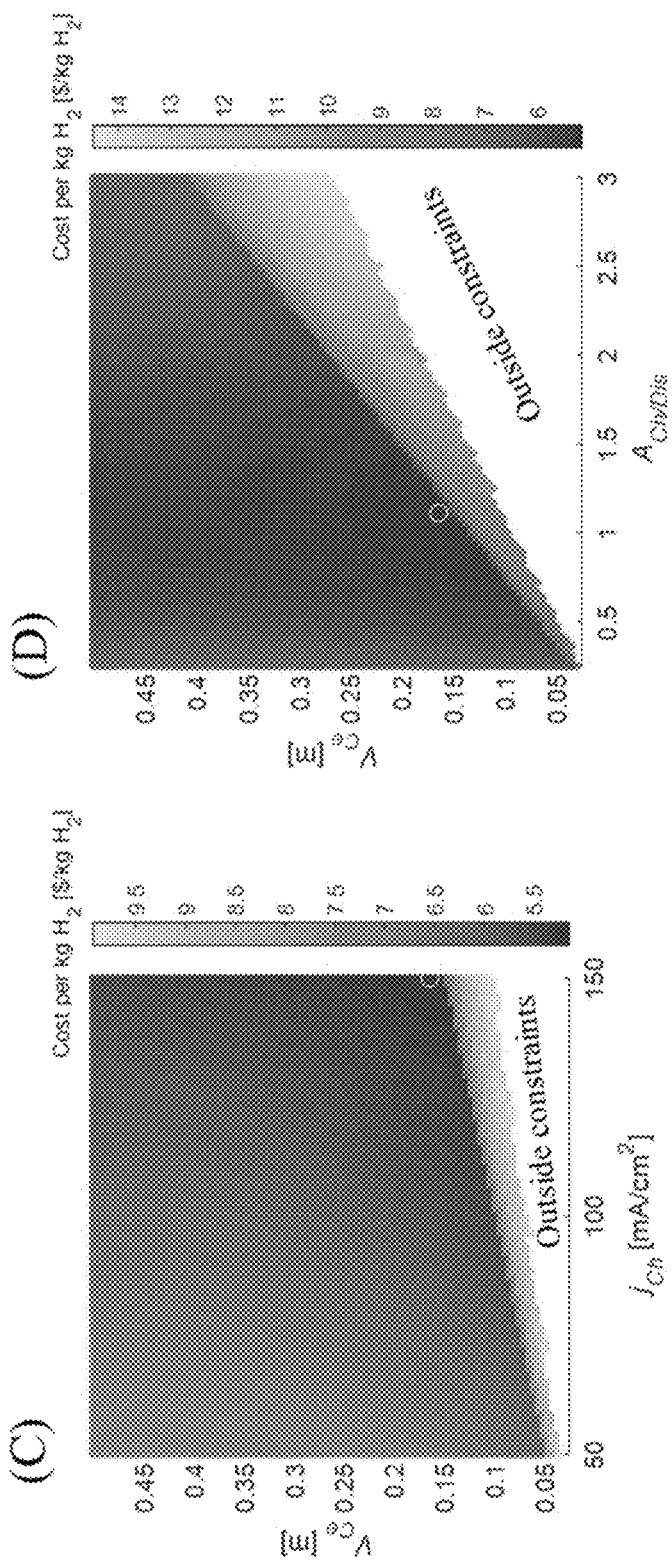

Optimal operation not only depends on the scheduling of the cells but also on their operation parameters. To illustrate this point, a system optimization was performed to find optimal values for the relative volume of Ce solutions (i.e., normalized by the geometric area of the electrodes in the discharging cell), $V_{Ce}$, the operating current densities of the charging cell, $j_{ch}$, and the ratio between the geometric areas of the electrodes in the charging and discharging cells, $A_{ch/dis}$. The discharging current density, $j_{dis}$, was kept constant because the costs were always the lowest for its maximum demonstrated value. The three-variable optimization can be visualized in FIG. 16. The white circles represent the location of an optimal cost. The empty space is due to the combination of variables that failed to adhere to the physical constraint of having only positive concentrations of Ce(III/IV). The minimum cost under the high solar scenario was found to be $5.14/kg H$_2$, which is 30% higher than that estimated for a conventional electrolyzer. This cost is estimated for an optimal cell operation at $j_{ch}$=150 mA/cm$^2$ (i.e., the maximum value experimentally demonstrated), $A_{ch/dis}$=1.11, and $V_{Ce}$=0.164 m.

Figure 17:
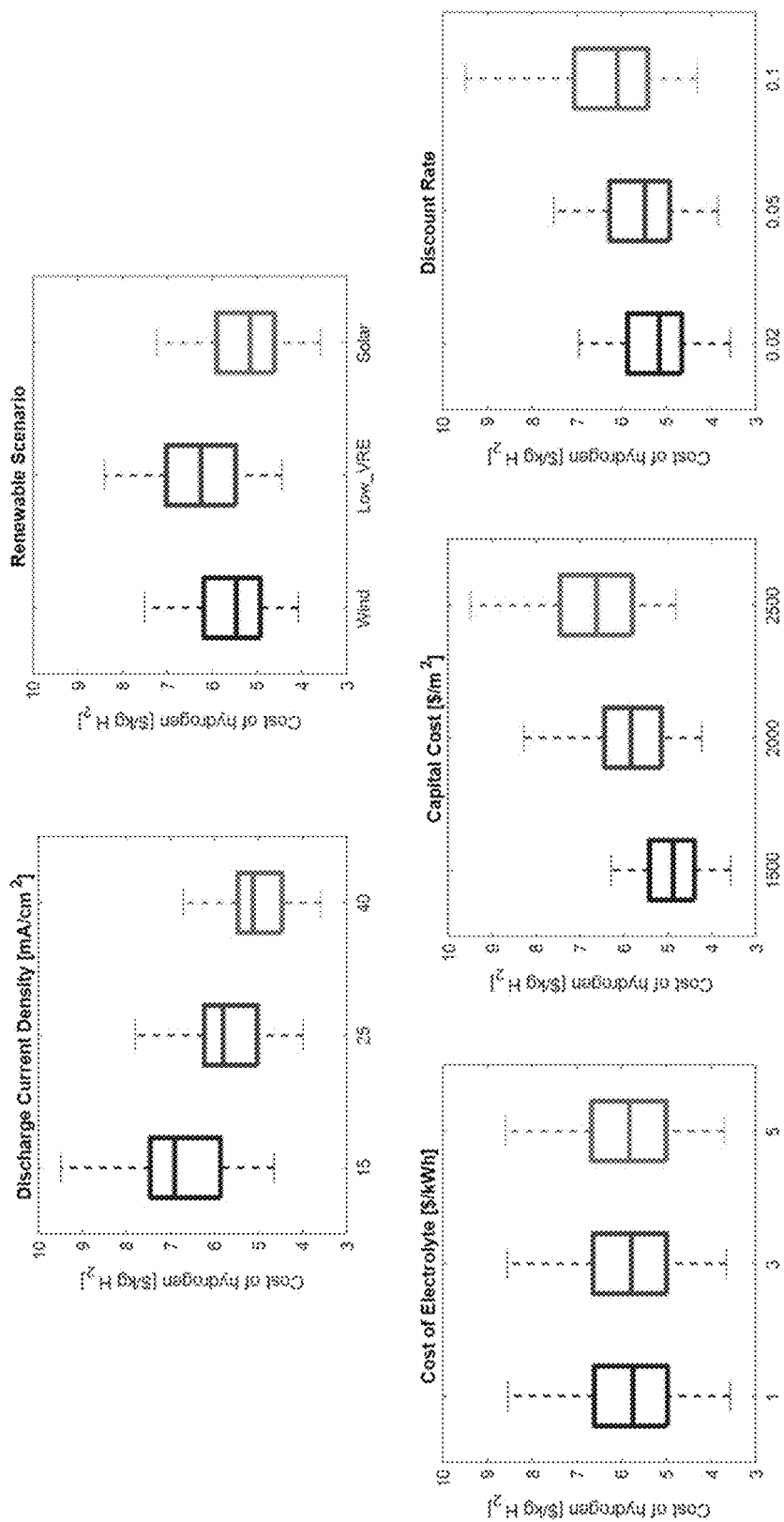
FIG. 17 shows boxplots of the five parameters used in the model. The line represents the median cost value. The edges of the box correspond to the values between the $25^{th}$ and $75^{th}$ percentile. The whiskers represent the values contained in 99.3% of the data. The outliers are not shown.

Next, a sensitivity analysis was performed to better understand how operating and economic factors affected $C_{H2}$. The parameters that were varied included $j_{Dis}$, $C_{Cap}$, $C_{Sol}$, r, and the renewable scenario. A low, middle, and high value were selected for each parameter, and optimal costs were calculated for a combinatorial set of them. Boxplots are shown in FIG. 17, in which the middle line indicates the median, the box contains the values within the 25$^{th}$ and 75$^{th}$ percentile, and the whiskers contain 99.3% of the $C_{H2}$ values. The analysis suggests that $j_{dis}$ and $C_{Cap}$ have the largest impact on $C_{H2}$. As $j_{dis}$ increases and the time for discharging cycles decrease, the overall amount of time allocated for charging cycles increases, resulting in larger amounts of hydrogen production and thus reducing $C_{H2}$. As $C_{Cap}$ increases, it has a large impact on the overall cost because the production rate per area is relatively low. In addition, the renewable energy scenario affects $C_{H2}$ considerably, with the high solar scenario providing the lowest costs. With more renewable penetration, the electricity prices become more variable, allowing the charging cell to be run at lower prices on average. The discount rate has a strong effect on $C_{H2}$ due to the large upfront capital investment required for the electrochemical system. The cost of the cerium electrolyte shows very little variability, indicating that the electrolyte cost is not a major cost contributor.

Figure 18:
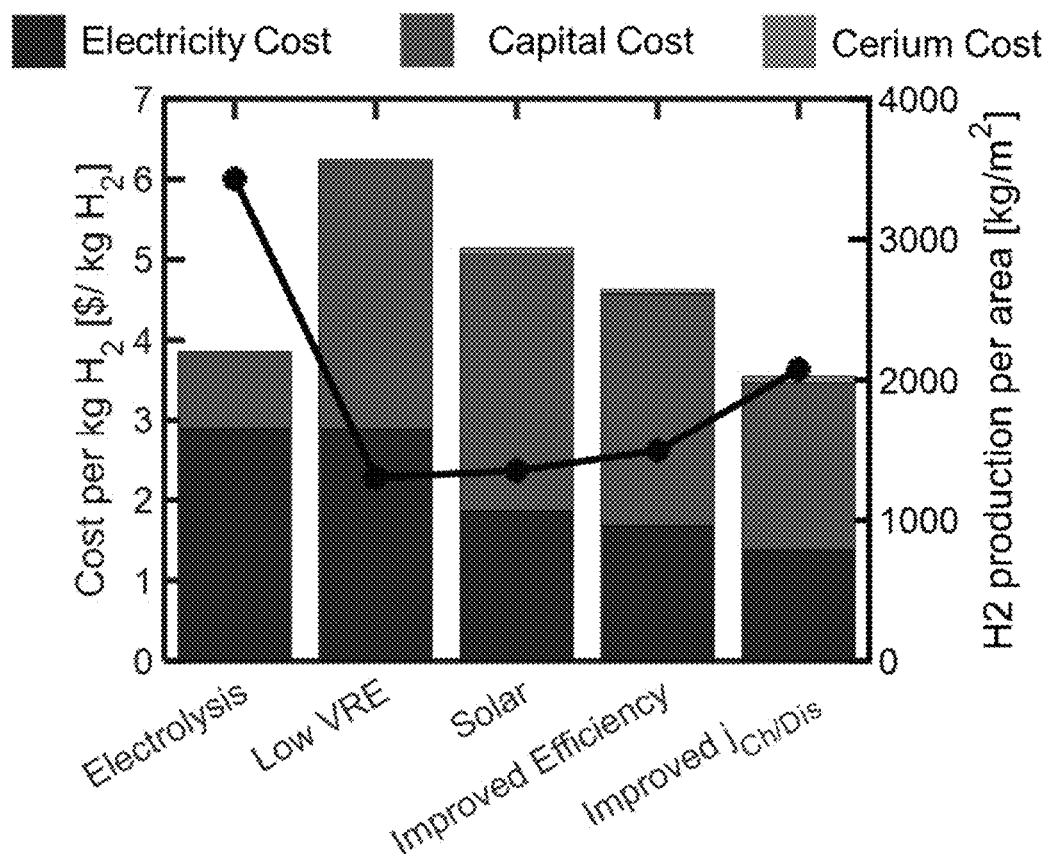
FIG. 18 shows an example of a comparison between the cost of electrolysis and that of a system of the present disclosure. Improved Efficiency means that the overpotential for both cells was reduced by half. Improved $j_{Ch/Dis}$ means the maximum current densities for each cell was increased by 67%.

Pathway to cost-competitive decoupled water electrolysis. The ultimate implementation of decoupled water splitting systems will depend on their ability to provide economic benefits over state-of-the-art electrolyzers. To better understand the advances needed for that to be the case, the $C_{H2}$ for the Ce-mediated electrolysis system were compared with the cost of hydrogen production estimated for state-of-the-art proton-exchange membrane (PEM) electrolyzers (FIG. 18). The analysis shows that the current $C_{H2}$ from PEM electrolyzers is lower than that from the Ce-mediated system, despite a reduction in the electricity costs achieved by the system. The differences in $C_{H2}$ are mainly due to the larger hydrogen production rates in electrolyzers compared to that of the Ce-mediated system, which ultimately lowers the capital cost per kg of H$_2$ produced. If the charging cell of the redox-mediated system could achieve a 50% decrease in overpotential, this would lead to a 10% reduction in electricity cost but would still result in a higher $C_{H2}$ than the PEM electrolysis benchmark. To achieve a $C_{H2}$ lower than water electrolyzers, the redox-mediated system would need to achieve $j_{ch}$ and $j_{dis}$, higher than 250 mA/cm$^2$ and 42 mA/cm$^2$, respectively. Higher operating current densities would significantly reduce $C_{Cap}$. Although these values are outside the current experimental demonstrations, the technology readiness level (TRL) of redox-mediated electrolyzers are significantly lower than those of PEM electrolyzers. Based on this model, increasing the efficiency and current densities of redox-mediated water electrolyzers is expected to result in improvements that would make this system economically viable in renewable-rich electricity grids.

This example demonstrated a Ce-mediated dual-use energy storage and/or hydrogen production system. By using a redox couple with a higher oxidation potential than water, the water electrolysis process can be decoupled into a charging cell that uses electricity to produce hydrogen, while the discharging cell generates electricity while oxidizing water. This unique feature allows the Ce-mediated system to take advantage of the electricity price variability caused by higher rates of renewable penetration. This example shows how the redox species concentration, convective transport, and thermal effects affected the performance of the dual-use system. It was demonstrated that operation with low concentrations of the reactant species resulted in mass transport limitations which limited the maximum attainable Ce partial current densities of the charging cell. These effects can be partly overcome through the implementation of higher redox solution flow rates that enhance convective mass transport. Increased temperatures were also shown to improve the performance of the system and increased the FE in the charging cell. Experimental results suggest that the development of high-performance Ce-mediated water electrolyzers would require improvements in mass transport of redox species to the electrodes and electrode kinetics to promote high FE.

To complement the experimental demonstration of a dual-use decoupled water electrolysis system, an economic analysis was performed to identify optimal operation parameters that lead the minimum H$_2$ production cost. Optimal sizing parameters, $j_{Ch}$, $A_{Ch/Dis}$, and $V_{Ce}$, were determined to be 150 mA/cm$^2$, 1.11, and 0.164 m, respectively, leading to a $C_{H2}$ of $5.14/kg H$_2$. Furthermore, a sensitivity analysis on the model parameters showed that $j_{Dis}$ and $C_{Cap}$ have the largest effects on $C_{H2}$, and that maximum economic benefits can be achieved when the de-coupled electrolysis system is implemented in renewable-rich electricity grids. While the estimated $C_{H2}$ for the Ce-mediated system is higher than state-of-the-art PEM electrolyzers, this example demonstrates that improvements in overpotential by 50% and improvements in current densities of 60% would lead to comparable cost of H$_2$ production.

Methods

Flow Cell Setup. The flow cell chassis and flow plates were made by Fuel Cell Technologies. A 5 cm² serpentine titanium flow field was used on both sides of the cell. For cerium oxidation and reduction, a single layer of platinized titanium mesh was used as the electrode (200 nm Pt sputtered on Ti mesh). Nafion® 117 was used as the proton conducting membrane and were was pretreated following the procedure in Ref. 13. For the HER, a Pt catalyst layer was sprayed directly onto the membrane. The catalyst layer solution was made by adding 0.0125 g of 40% Pt/C (loading of 0.5 mg/cm²), 2 mL 70% isopropyl alcohol (IPA), and 0.0155 mL 20% Nafion® solution. 1 mL of this solution was added to a Master Airbrush airbrush and was sprayed onto the Nafion membrane directly. After the catalyst layer was dry (about 30 minutes), the membrane was hot pressed at 145° C. for 90 seconds. Once the membrane was cooled, it was stored in water until use. For the OER, an Ir catalyst layer was made in the same way as described above with two changes: 0.0625 g of 40% Ir/C (loading of 2.5 mg/cm²) replaced the Pt/C and 0.104 mL of 20% Nafion® solution was added to this suspension.

The starting solution concentration of Ce(III) was kept at 0.6M in 4M methanesulfonic acid (MSA). Higher concentrations were attempted, but precipitation occurred. Cerium (III) carbonate and 99.9% MSA were obtained from Sigma-Aldrich. The cerium(IV) mentioned throughout this example was produced entirely electrochemically.

During operation of the charging cell, the cerium solution was pumped into the anodic side by using a peristaltic pump from Syringepump.com, while nothing was flowed in the cathodic side. For the discharging cell, peristaltic pumps were used to pump the cerium solution on the cathodic side and deionized water on the anodic side.

Faradaic Efficiency. Faradaic efficiency (FE) is defined as follows:

$$FE = \frac{\text{\# of electrons used in desired reaction}}{\text{Total number of electrons passed through cell}}$$

Using Faraday's law, the theoretical total number of moles of electrons passed can be determined during a given duration of time at a certain total current. Using the potentiostat, a constant current was set. Once the voltage was stable (the cell was at steady state), a sample of the outlet stream was collected over a given time. The volume of this sample was measured to be used in further calculations. To measure the actual number of electrons lost in the oxidation from Ce(III) to Ce(IV), electrochemical titration with iron (II) sulfate was used to measure the concentration of Ce(IV).

A small amount of the collected Ce(IV) sample was placed in a beaker containing a reference electrode (Ag/AgCl) and a platinum mesh working electrode. 1M sulfuric acid was added to ensure the electrodes were submerged in solution. The open circuit voltage (OCV) was monitored as the Fe(II) sulfate solution was added dropwise to the beaker, since the OCV changes with the concentrations of Ce(III), Ce(IV), Fe(II), and Fe(III). When the solution contains only Ce(III) and Ce(IV), the OCV is around 1.15 V (this depends on the relative concentrations of Ce(III) to Ce(IV)). At the equilibrium point, when all the Ce(IV) is consumed and there is a combination of Fe(II) and Fe(III), the OCV drops to 0.65V. The concentration of Ce(IV) is then determined from the volume of Fe solution added, its concentration, and the volume of the cerium solution.

Polarization curves. A Bio-Logic Science Instruments SP-50 potentiostat was used to control and measure current and voltage for the I-V curves. For both subsystems, the flow rate was set on peristaltic pump. To record the I-V curve, a constant current was applied to the cell for 10 seconds while the voltage was recorded, then the current switched instantly to a different current, which was held for 10 seconds. This process occurred until the final current was reached. For the charging cell, the current density ranged from 2 mA/cm² to 160 mA/cm². For the discharging cell, the current density ranged from 0.02 mA/cm² to 20 mA/cm². The voltage at each current was averaged over the 10 second duration. Three trials for each curve were run and the voltage values at each current were averaged to obtain the final graphs. In order to account for the FE, the current density was multiplied by its corresponding FE. Therefore, the polarization curves show the performance only due to the cerium oxidation.

Economic Analysis. Energy prices fluctuate differently depending on the amount and type of energy sources used. Usually, when more variable renewable energy (VRE) is added (e.g. wind or solar), the fluctuations are much greater. Data from the California Independent System Operator (CAISO) provided the average price of energy for every hour of the day for different renewable energy penetration scenarios, examples of which are shown in Table 5. To make sure that only the variability was being considered, the prices were modified so that all the scenarios had the same average price. The cost to produce hydrogen was calculated by:

$$C_{H2} = \frac{\sum_{t=1}^{t=n} \frac{(C_P + C_R + C_E)}{(1+r)^t}}{\sum_{t=1}^{t=n} \frac{P_{H2}}{(1+r)^t}}$$

Where $C_P$ is the cost of the power components, $C_R$ is the cost of storage of the redox species, $C_E$ is cost of electricity, $P_{H2}$ is the yearly production of hydrogen gas in kg, r is the discount rate, and t is the specific year of operation. $C_P$ consisted of the cost of the stack ($C_{stack}$) and the balance-of-plant costs ($C_{BoP}$), which included pumps and a control system. The projected operational lifetime of the stacks was five years, so the stacks were replaced when both stacks had run for five years. The total length of the model spanned 20 years.

TABLE 5

Various renewable energy contribution scenarios

| Scenario | Grid components | More price variability vs. Low VRE |
|---|---|---|
| Low VRE | 7% Wind | — |
|  | 14% Solar |  |
| Balanced VRE | 20% Wind | 2.9x |
|  | 20% Solar |  |
| High Wind | 30% Wind | 3.0x |
|  | 10% Solar |  |
| High Solar | 10% Wind | 3.4x |
|  | 30% Solar |  |

$C_R$ included the cost of the tank ($C_{tank}$) to store the redox species, as well as the cost of the redox species itself ($C_{sol}$). The tank was assumed to last the entire lifetime of the system and was not replaced at any time in the model, while the redox species was replaced at the same time as the stacks.

$C_E$ was calculated by simulating the operation of the system over the course of a year to determine the amount of electricity consumed and generated. At each hour of the year, the system could either run the charging cell or the discharging cell. The decision was based on the electricity price during that hour, the constraint that the concentrations of Ce(III) and Ce(IV) couldn't become negative, and the values of the operational variables. During operation of the system, the total amount of Ce(III) oxidized should have equaled the amount of Ce(IV) reduced so that the concentrations stay within a reasonable range. This means that the total amount of charge used in cerium oxidation in the charging cell must be equal to the total amount of charge passed in the discharging cell. The model accounts for this by using the following equation:

$$\frac{j_{Ch}A_{Ch}FE}{j_{Dis}A_{Dis}} = \frac{t_{Dis}}{t_{Ch}}$$

Where j is the current density for the charging or discharging cell, A is the area of the charging or discharging cell, FE is the faradaic efficiency of the charging cell, and $t_{Dis}/t_{Ch}$ is the ratio of the time the charging or discharging cell is running. Once the time ratio was known, it could be used to set the times when the charging cell would run as opposed to the discharging cell. Since the charging cell consumes energy and the discharging cell generates energy, the charging cell would run when the energy prices are lowest, while the discharging cell would run when the prices were highest. The prices were sorted from low price to high, and then the first $8760/(1+t_{Dis}/t_{Ch})$ were set for charging. Subsequently, the charge or discharge decisions were modified by taking into account the constraint in which the concentration of Ce(III) or Ce(IV) couldn't become negative.

To calculate the cost of electricity for the charging cell, the price (in $/Wh) was multiplied by the current density, the cell voltage, and the area of the cell. The same was done for the revenue of the discharging cell, but it was subtracted from the total cost. The amount of hydrogen produced was determined by Faraday's law, assuming all the current from the charging cell was used to produce hydrogen gas.

Figure 19:
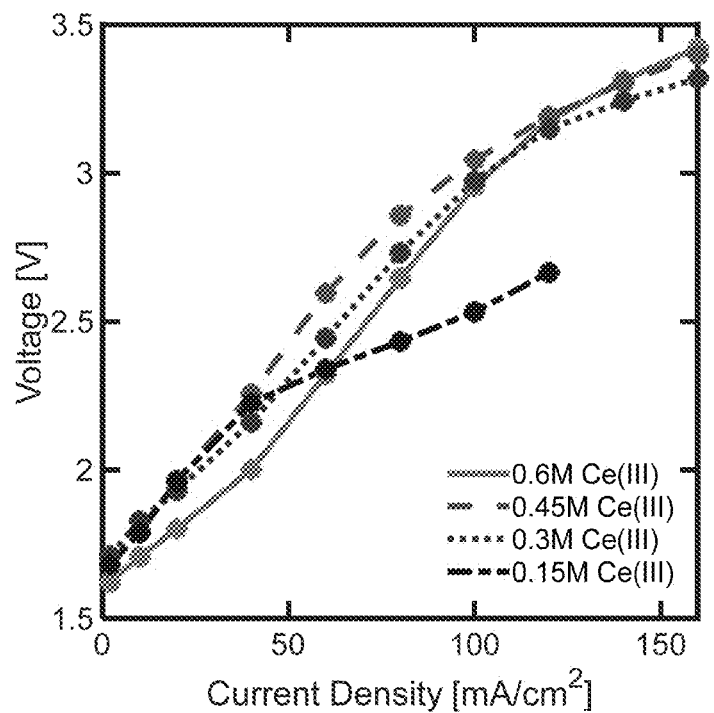
FIG. 19 an example of a total charging cell polarization curve for the variation of Ce(III) concentration.
Figure 20:
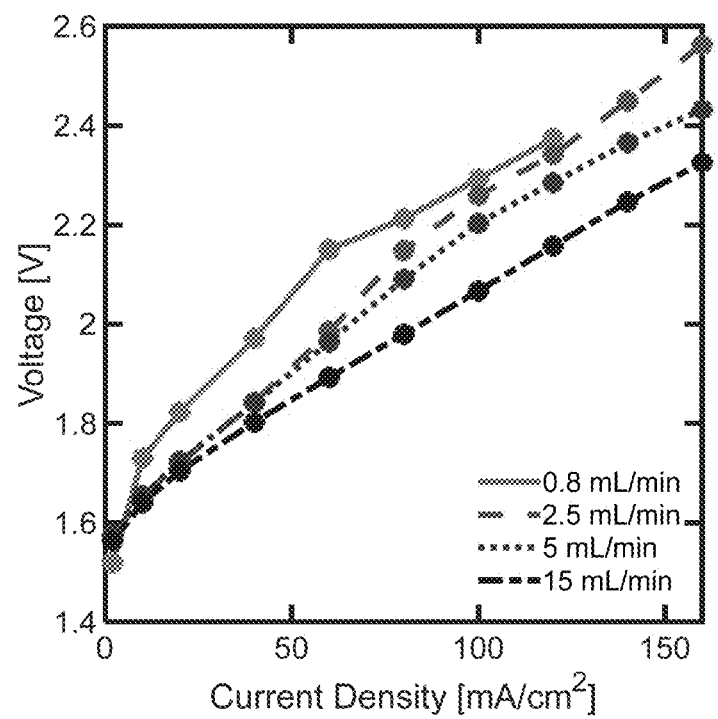
FIG. 20 shows an example of a total charging cell polarization curve for the variation of flow rate.
Figure 21:
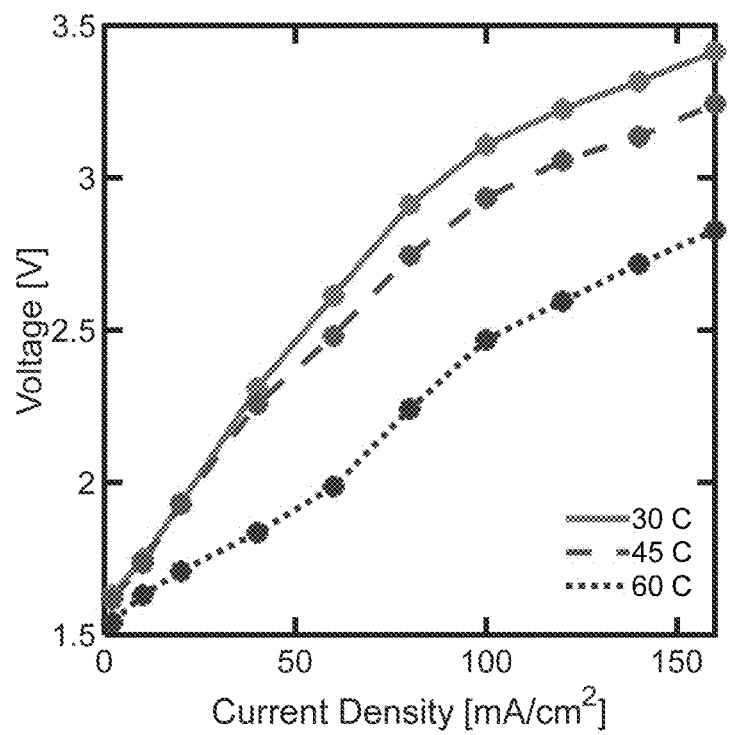
FIG. 21 shows an example of a total charging cell polarization curve for the variation of temperature.

Polarization curves for the charging cell shown in the main text are partial polarization curves for the Ce(III) oxidation reaction. These were obtained by multiplying the current densities of the original polarization curves by the interpolated Faradaic efficiencies from the data shown in the main text. The original polarization curves are shown in FIG. 19-21.

Although the present disclosure has been described with respect to one or more particular embodiments and/or examples, it will be understood that other embodiments and/or examples of the present disclosure may be made without departing from the scope of the present disclosure.

The invention claimed is:

1. A method for producing hydrogen and oxygen comprising:
   (i) oxidizing a mediator at a working electrode to yield an oxidized mediator and reducing protons or water at a counter electrode to yield hydrogen; and
   (ii) reducing an oxidized mediator at a working electrode to yield the mediator, and oxidizing water at a counter electrode to yield oxygen,
wherein the oxygen generation is performed simultaneously or non-simultaneously relative to the hydrogen generation and at a different current density, and
wherein the oxidized mediator of (i) is used as the oxidized mediator of (ii), or the mediator of (ii) is used as the mediator of (i), and
wherein the mediator has a reversible redox potential lying outside the onset of the oxygen evolution reaction (OER) and the hydrogen evolution reaction (HER).

2. The method of claim 1, wherein the mediator is a $H^+$ donor and/or acceptor.

3. The method of claim 1, wherein the mediator has a reversible reduction potential lying in the range of +1.5 to +3.5 V vs SHE and/or a reversible oxidation potential lying in the range of +0.2 to +3.5 V vs SHE.

4. The method claim 1, wherein the mediator and the oxidized mediator are prevented from contacting the hydrogen or oxygen evolution electrode, respectively.

5. The method of claim 1, wherein the mediator is provided in an electrolyte, and a change in the pH of the electrolyte is 1 unit or less throughout (i) and/or (ii).

6. The method of claim 1, wherein (ii) is performed first, followed by (i).

7. The method of claim 1, further comprising collecting the produced hydrogen and/or oxygen.

8. The method of claim 1, wherein (i) includes the recovery of the oxidized mediator and/or (ii) includes the recovery of the mediator.

* * * * *